(12) United States Patent
Vippagunta et al.

(10) Patent No.: US 9,928,518 B1
(45) Date of Patent: Mar. 27, 2018

(54) TRANSACTION PROCESSING USING MOBILE DEVICES

(75) Inventors: Rajendra Kumar Vippagunta, Issaquah, WA (US); Jon T. Rogers, Seattle, WA (US); Jason David Birchler, Seattle, WA (US); Tal Elisha Shprecher, Seattle, WA (US); Artur Barbalho de Oliveira Souza, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 109 days.

(21) Appl. No.: 13/470,108

(22) Filed: May 11, 2012

(51) Int. Cl.
*G06Q 30/00* (2012.01)
*G06Q 30/02* (2012.01)
*G06Q 20/36* (2012.01)

(52) U.S. Cl.
CPC ....... *G06Q 30/0211* (2013.01); *G06Q 20/367* (2013.01)

(58) Field of Classification Search
USPC .............. 705/7.11–7.42, 14.1–14.38, 50–79
See application file for complete search history.

(56) References Cited

U.S. PATENT DOCUMENTS

| | | | | |
|---|---|---|---|---|
| 5,960,411 A * | 9/1999 | Hartman | ............... | G06Q 10/087 705/26.8 |
| 6,014,634 A * | 1/2000 | Scroggie | ................ | G06Q 20/12 705/14.25 |
| 6,052,675 A * | 4/2000 | Checchio | ............... | G06Q 20/02 705/39 |
| 6,251,017 B1 * | 6/2001 | Leason | ................. | A63F 3/0645 273/138.2 |
| 6,516,302 B1 * | 2/2003 | Deaton | .................. | G06Q 20/20 705/14.38 |
| 6,587,835 B1 * | 7/2003 | Treyz | ..................... | G06Q 20/12 705/14.64 |

(Continued)

OTHER PUBLICATIONS

Aloul, Fadi, Syed Zahidi, and Wassim El-Hajj. "Two factor authentication using mobile phones." Computer Systems and Applications, 2009. AICCSA 2009. IEEE/ACS International Conference on. IEEE, 2009.*

(Continued)

*Primary Examiner* — Alan S Miller
(74) *Attorney, Agent, or Firm* — Lee & Hayes, PLLC

(57) ABSTRACT

The use of a mobile device with a merchant application may enable the merchant to turn the mobile device into a point-of-sale terminal that interfaces with a server. The server may receive from the mobile device a transaction via a network, in which the transaction includes transaction details for a purchase request made by a customer. In turn, the server may transmit a transaction token that identifies the transaction to the mobile device of the merchant. Subsequently, the server may receive the transaction token from a client device of the customer. The transaction token being transmitted from the mobile device to the client device using a short range communication that is independent of the network. After receiving the transaction token, the server may provide the transaction details of the transaction that matches the transaction token to the client device for display so that the customer may pay for the transaction.

25 Claims, 13 Drawing Sheets

(56) References Cited

U.S. PATENT DOCUMENTS

| | | | | |
|---|---|---|---|---|
| 7,801,766 B2* | 9/2010 | Bunger | G06Q 20/20 | 705/16 |
| 8,290,876 B1* | 10/2012 | Powell | G06Q 20/10 | 705/64 |
| 8,332,277 B2* | 12/2012 | McCaffery | G06Q 20/20 | 235/375 |
| 8,584,251 B2* | 11/2013 | McGuire | G06Q 20/383 | 726/26 |
| 9,390,416 B2* | 7/2016 | Agarwal | G06F 17/277 | |
| 2005/0165684 A1* | 7/2005 | Jensen | G06Q 20/00 | 705/44 |
| 2007/0198411 A1* | 8/2007 | Kavanagh | G06Q 20/04 | 705/44 |
| 2009/0254479 A1* | 10/2009 | Pharris | G06Q 20/102 | 705/42 |
| 2010/0257612 A1* | 10/2010 | McGuire | G06Q 20/383 | 726/26 |
| 2010/0299198 A1* | 11/2010 | Catania | G06Q 20/3829 | 705/14.38 |
| 2011/0016050 A1* | 1/2011 | Evans | G06Q 20/10 | 705/44 |
| 2011/0251892 A1* | 10/2011 | Laracey | G06Q 30/0253 | 705/14.51 |
| 2012/0124656 A1* | 5/2012 | Senac | H04L 9/3213 | 726/9 |
| 2013/0054336 A1* | 2/2013 | Graylin | H04L 67/02 | 705/14.26 |
| 2013/0085804 A1* | 4/2013 | Leff | G06Q 30/0219 | 705/7.29 |
| 2013/0198084 A1* | 8/2013 | Agarwal | G06F 17/277 | 705/44 |
| 2013/0204790 A1* | 8/2013 | Agarwal | G06F 17/277 | 705/44 |
| 2014/0101741 A1* | 4/2014 | Senac | H04L 9/3213 | 726/7 |
| 2016/0247151 A1* | 8/2016 | Gupta | G06Q 20/085 | |

OTHER PUBLICATIONS

Romao, Artur, and Miguel Mira da Silva. "An agent-based secure Internet payment system for mobile computing." Trends in Distributed Systems for Electronic Commerce. Springer, Berlin, Heidelberg, 1998. 80-93.*

Leong, C. Y., et al. "Near field communication and bluetooth bridge system for mobile commerce." Industrial Informatics, 2006 IEEE International Conference on. IEEE, 2006.*

Ion, Iulia, and Boris Dragovic. "Don't trust POS terminals! Verify in-shop payments with your phone." Proceedings of SMPU 8 (2010).*

Krugel, Gavin Troy. "Mobile Banking Technology Options." FinMark Trust (2007).*

Ghag, Omkar, and Saket Hegde. "A comprehensive study of google wallet as an NFC application." International Journal of Computer Applications 58.16 (2012).*

Blaze, Matt, John Ioannidis, and Angelos D. Keromytis. "Offline micropayments without trusted hardware." Financial Cryptography. 2001.*

* cited by examiner

TRANSACTION PROCESSING USING MOBILE DEVICES

BACKGROUND

In today's marketplaces, merchants often rely on credit card terminals to process payments made using payment cards such as debit cards, credit cards, gift cards, and other electronic payments. However, the use of such credit card terminals may be uneconomical for small merchants or startup businesses because of the terminal fees associated with acquiring a point-of-sale (POS) terminal (e.g., electronic cash register) that is capable of interfacing with a credit card terminal, and/or service fees charged by a financial service provider for each use of the credit card terminal. For example, a small merchant may not generate enough profit from the sale of products or services to justify investing in an electronic cash register, and/or paying the transaction service fee associated with accepting card payment for the sale of a product or a service. Accordingly, the merchant may be forced to accept only cash or checks, or to increase the price of the product or service to cover the card transaction costs. However, such measures taken by the merchant may result in the loss of sales due to inability to compete with other merchants based on price, or due to inconvenience imposed on the customers of the merchant.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
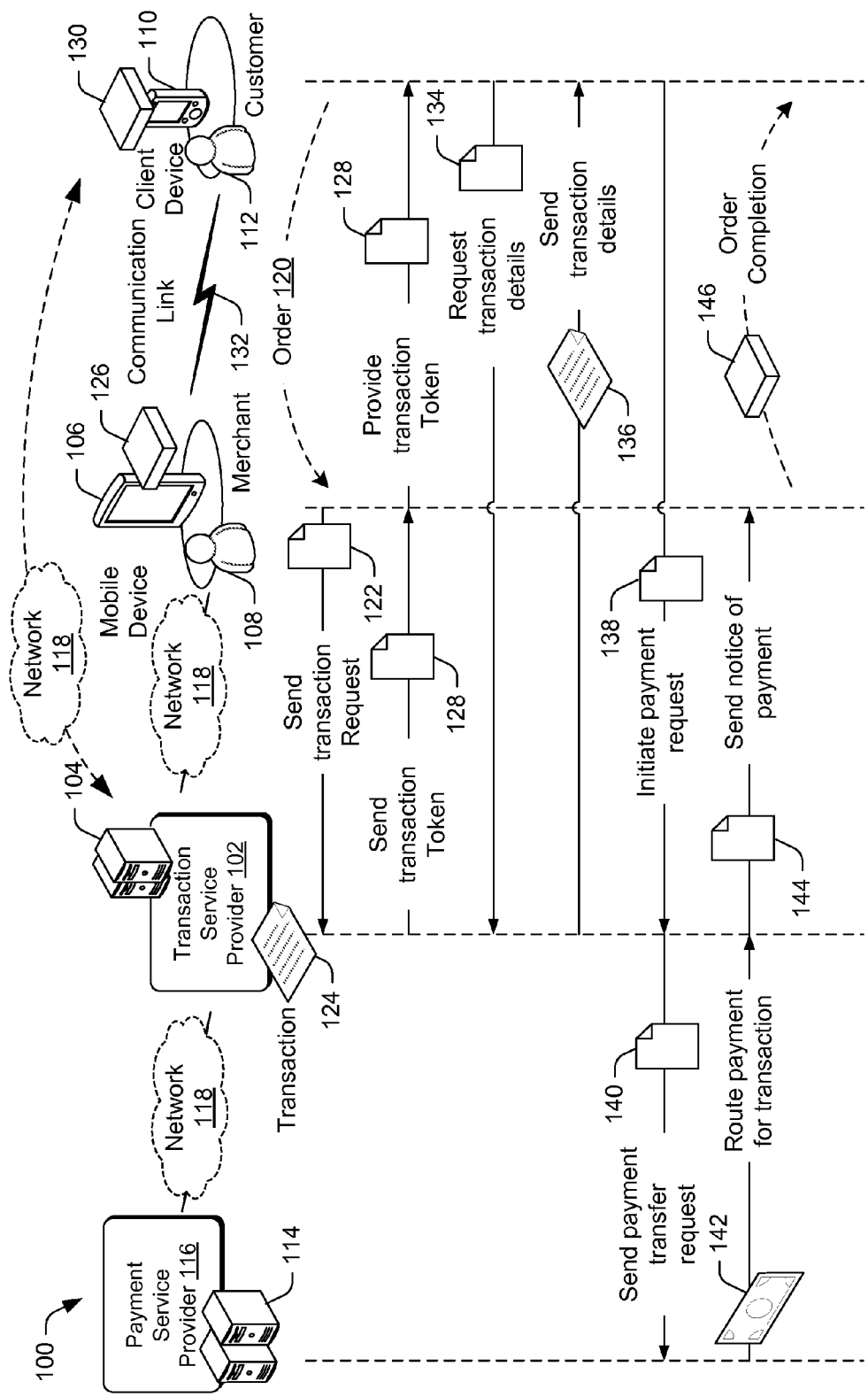
FIG. 1 is a schematic diagram of an illustrative computing environment for using a transaction service provider to support the use of a mobile device as a point-of-sale device.

This disclosure is directed in part to techniques for configuring a mobile device as a point-of-sale terminal to allow a merchant to process transactions for products or services. The mobile device may execute a merchant application that interfaces with a transaction engine that resides on a server. The server may communicate with the mobile device over a network, such as the Internet. In some embodiments, the server may reside in a data process center that is part of a computing cloud. In operation, the merchant application on the mobile device may transmit transaction details regarding a transaction initiated by a customer to the transaction engine. In turn the transaction engine may generate a transaction token that identifies the transaction and transmits the transaction token back to the merchant application on the mobile device. The merchant application on the mobile device may then transmit the transaction token to a customer application running on a client device of the customer. In various embodiments, the transaction token may be transmitted as near field communication (NFC) data using NFC communication components or other short range communication components on the mobile device and the client device. In at least one embodiment, the NFC communication components for completing the transfer of the transaction token may be a speaker on the mobile device of the merchant and a microphone on the client device of the customer. However, other auditory or visual techniques may be used to exchange information.

In turn, the customer application on the client device may transmit the transaction token to the transaction engine on the server via the network to acquire the transaction details of the transaction from the server. Once the transaction details have been acquired, the customer application may display the transaction details as a part of a payment prompt to the customer. The customer may then use the customer application to initiate a payment for the product or service via a customer account stored on the transaction engine. In various embodiments, the stored customer account may be linked with one or more payment instruments, such as credit cards, debit cards, bank accounts, and/or gift cards, which are used by the customer to pay for the transaction. Once the payment has been made, the transaction engine may notify the merchant application running on the mobile device, so that the merchant application may display a payment notification to the merchant. In response, the merchant may deliver the product or service that is purchased through the transaction to the customer.

The use of a suitable mobile device with a merchant application may enable the merchant to turn the mobile device into a point-of-sale terminal that has the ability to process electronic transactions. Since the cost of a mobile device often is only a fraction of the cost of a point-sale-terminal (e.g., an electronic cash register with an attached credit card terminal), the mobile device running a merchant application may be an affordable alternative for small merchants or startup businesses who are otherwise unable to invest in conventional point-of-sale terminals. Further, the portable nature of the mobile device may actually make the combination of the mobile device with the merchant application more practical for certain merchants than conventional point-of-sale terminals. For example, a merchant who does not have a permanent brick-and-mortar location, such as a merchant that conducts sales at conventions, flea markets, Sunday markets, or other non-permanent venues may find the use of the mobile device more convenient.

Moreover, in some instances, the transaction fee that an operator of the transaction engine charges per transaction may be less than the transaction fee charged by a financial service provider for the use of a credit card terminal. Such savings in fees may translate into additional profit for a merchant or a small business, which may help such a merchant or business to expand and grow. An illustrative environment and illustrative techniques for using a mobile device equipped with a merchant application to process transactions are described below. However, the described techniques may be implemented in other environments.

Illustrative System Architecture

FIG. 1 is a schematic diagram of an illustrative computing environment 100 for using a transaction service provider to support the use of a mobile device as a point-of-sale device. The computing environment may include a transaction service provider 102. The transaction service provider 102 may include servers 104 that interact with multiple mobile devices that are used by merchants, such as a mobile device 106 that is used by a merchant 108. The servers 104 may also interact with client devices that are used by customers, such as the client device 110 that is used by a customer 112. The servers 104 of the transaction service provider 102 may also interact with one or more servers 114 of a payment service provider 116. In various embodiments, the servers 104 of the transaction service provider 102 may communicate with the mobile device 106, the client device 110, and the servers 114 of the payment service provider 116 via a network 118. The network 118 may be a local area network ("LAN"), a larger network such as a wide area network ("WAN"), a mobile telephone network, and/or a collection of networks, such as the Internet. The network 118 may be a wired network, a wireless network, or both.

Each of the mobile device 106 and the client device 110 may be a mobile communication device, a smart phone, a portable computer, a tablet computer, a slate computer, or any other electronic device that is equipped with network communication components to receive and transmit data, data processing components to process data, and user interface components to receive data from and present data to a user. Further, each of the mobile device 106 and the client device 110 may include some type of short range communication ability that is independent of on the network 118. In some embodiments, each of the mobile device 106 and the client device 110 may be equipped with NFC transceivers that enabled the devices to directly exchange data. In other embodiments, each of the mobile device 106 and the client device 110 may include components that enable the devices to exchange data via a Bluetooth link, a Wi-Fi connection, light-based communication (e.g., infrared data transfer), image-based communication (e.g., quick response (QR) codes), and/or acoustic-based data transfer. For example, the mobile device 106 may include software components and a speaker that enable the mobile device 106 to broadcast data to the client device 110 as sound waves, while the client device 110 may include software components and microphone that enable the client device 110 to receive the data embedded in the sound waves.

The payment service provider 116 may be a financial institution with which the customer 112 has established one or more financial accounts. A financial account may be a checking account, a savings account, a debit card account, a credit card account, a charge card account, a gift card account, and/or the like. Further, the customer 112 may also create a user account with the transaction service provider 102. The user account for the customer 112 may include account access information that enables the customer 112 to direct the transaction service provider 102 to obtain funds from the one or more financial accounts to pay another party, such as the merchant 108. The account access information may include bank account numbers, routing numbers, security codes, passwords, payment instrument expiration dates, and/or so forth.

In various embodiments, the customer 112 may initially place an order 120 for one or more items with the merchant 108. The order 120 may be placed with the merchant 108 at a brick-and-mortar store or at a temporary location, such as a flea market or Sunday market stall. The customer 112 may place the order 120 by verbally informing the merchant 108 that he or she desires to buy one or more items.

Subsequently, the merchant 108 may create a transaction request 122 on the mobile device 106 for the order 120. The transaction request 122 may include transaction details for the order 120, such as a purchase order number, a name of each item purchased, a description of each item, a cost of each item, a number of each item purchased, a purchase total, a merchant name, an identifier of a payment receivable account of the merchant 108, and/or so forth. The payment receivable account may be an account that the merchant 108 established with the transaction service provider 102. In various embodiments, the transaction request 122 may be created using a merchant application 126 that is installed on the mobile device 106. Once the merchant has created the transaction request 122, the merchant 108 may send the transaction request 122 via the network 118 to the transaction service provider 102, so that the transaction service provider 102 may create a transaction 124 that includes the transaction details from the transaction request 122.

After creating the transaction 124, the transaction service provider 102 may store the transaction 124 in a transaction database. The transaction service provider 102 may also assign a transaction token 128 to the transaction 124. Further, the transaction service provider 102 may send the transaction token 128 to the mobile device 106 via the network 118. Once the merchant 108 has been alerted that the mobile device 106 has received the transaction token 128, the merchant 108 may use the mobile device 106 to transfer the transaction token 128 to the client device 110 of the customer 112. The transfer may be accomplished via a short range communication link 132 that is independent of the network 118. In some embodiments, the transfer may be accomplished via NFC transceivers that are on the mobile device 106 and the client device 110. In other embodiments, the transfer may be accomplished using infrared beams, sound waves, and/or a Bluetooth link, as supported by the appropriate transceiver components on the devices.

The transaction token 128 may be received by a customer application 130 that is installed on the client device 110. After receiving the transaction token 128, the customer application 130 may transmit a detail request 134 for transaction details to the transaction service provider 102. The detail request 134 may include the transaction token 128. The customer application 130 may send the detail request 134 automatically following receipt of the transaction token 128, or following a command input from the customer 112. In response to receiving the detail request 134, the transaction service provider 102 may send the corresponding transaction details 136 of the transaction 124 to the customer application 130.

At the client device 110, the customer application 130 may display the transaction details 136 to the customer 112. As described above, the transaction details 136 may include a purchase order number, a name of each item purchased, a description of each item, a cost of each item, a number of each item purchased, a purchase total, a merchant name, an identifier of a payment receivable account of the merchant 108, and/or so forth. Once the customer 112 has reviewed the transaction details 136 and found them to be satisfactory, the customer 112 may use the customer application 130 to send a payment request 138 to the transaction service provider 102. The payment request 138 may include an identifier of the customer 112 and/or information that authenticate the customer 112 to the transaction service provider 102. The payment request 138 may be sent to the transaction service provider 102 via the network 118.

When the payment request 138 is received, the transaction service provider 102 may send a payment transfer request 140 to the payment service provider 116, such that the payment service provider 116 may pay the merchant 108 for the transaction 124. The payment transfer request 140 may include the account access information of a designated financial account if the customer 112, an identity of the customer 112, authentication information for the customer 112, contact information for the customer 112, an amount to be paid, the identifier of the payment receivable account of the merchant, and/or so forth. In at least one embodiment, the transaction service provider 102 may obtain the amount to be paid from the transaction details 136.

After receiving the request from the transaction service provider 102, the payment service provider 116 may process the request and route the correct amount of payment 142 from the designated financial account to the payment receivable account of the merchant 108. Once the transaction service provider 102 determines that the correct amount has been transferred to the payment receivable account of the merchant 108 (or a transaction has been initiated), the transaction service provider 102 may send a notice of payment 144 to the mobile device 106. The notice of payment 144 may be displayed by the merchant application 126 to the merchant 108. Accordingly, the merchant 108 may then provide the item(s) 146 (i.e., product(s) or service(s)) corresponding to the transaction 124 to the customer 112 to complete the order 120. However, in another scenario, the transaction service provider 102 may receive a notice from the payment service provider 116 that the payment transfer request 140 has been denied. In such a case, the transaction service provider 102 may indicate to the mobile device 106 of the payment failure for the transaction 124. In such a scenario, the merchant 108 may withhold the delivery of the item(s) 146. In some instances, when the transaction service provider 102 indicates to the mobile device 106 that the payment for the transaction 124 failed, the merchant 108 may inform the customer 112 of a payment failure. In turn, the customer 112 may use an option provided by the customer application 130 to resend the payment request 138 or send an alternative payment request that includes at least some modified account access information for the transaction 124.

In alternative embodiments, the payment service provider 116 may not transfer the payment 142 to the payment receivable account of the merchant 108 right away. Instead, the payment service provider 116 may send an approval notice to the transaction service provider 102. The approval notice may indicates that the payment 142 has been approved, but the actually delivery of the payment 142 may take place at a later time. In such embodiments, rather than sending the notice of payment 144 to the mobile device 106, the transaction server provider 102 may send a notice of payment approval to the mobile device 106. Accordingly, the merchant 108 may deliver the item(s) 146 based on the notice of payment approval. Subsequently, the payment service provider 116 may send the notice of payment 144 to the transaction service provider 102 once the transfer of the payment 142 to the payment receivable account of the merchant 108 does in fact take place at the later time. In response, the transaction service provider 102 may then send the notice of payment 144 to the mobile device 106.

However, instead of the notice of payment approval, the transaction service provider 102 may conversely receive a notice from the payment service provider 116 that the payment transfer request 140 has been denied. In such a case, the transaction service provider 102 may indicate to the mobile device 106 that a payment for the transaction 124 failed. In such a scenario, the merchant 108 may withhold the delivery of the item(s) 146 as described above.

Example Modules

Figure 2:
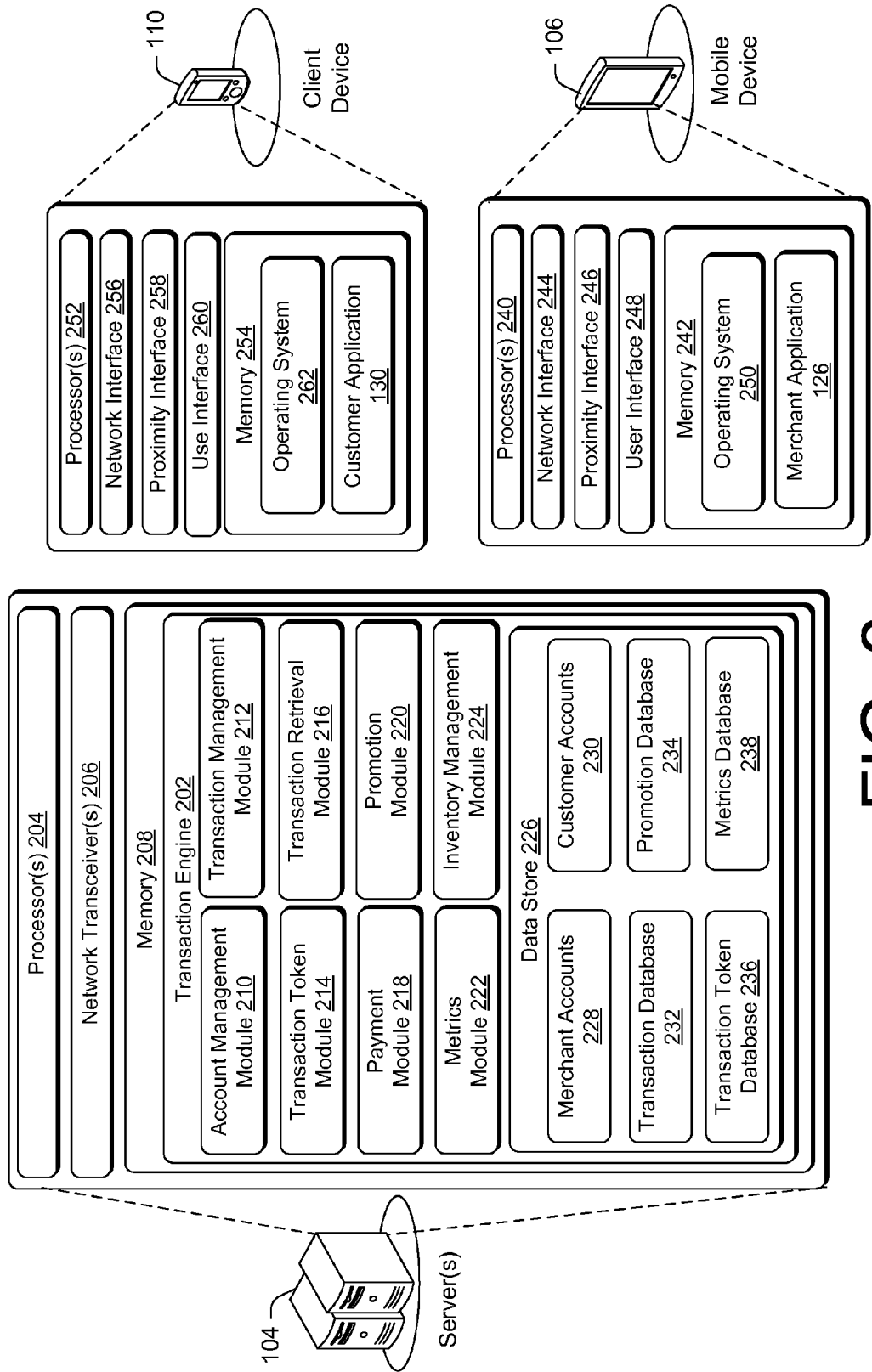
FIG. 2 is a schematic diagram of illustrative components in an example transaction engine that supports the use of a mobile device as a point-of-sale device, along with illustrative components in an example mobile device and a client device that interfaces with the transaction engine.

FIG. 2 is a schematic diagram of illustrative components in an example transaction engine 202 that supports the use of a mobile device as a point-of-sale device, along with illustrative components in an example mobile device and a client device that interfaces with the transaction engine.

The transaction engine 202 may be implemented by the one or more servers 104 of the transaction service provider 102. The servers 104 may include processor(s) 204, network transceiver(s) 206, and memory 208. The network transceiver(s) 206 may include wireless and/or wired communication components that enable the servers 104 to transmit data to and receive data from other servers and devices via the network 118. The memory 208 may include computer readable media. Computer readable media may include volatile and non-volatile, removable and non-removable media implemented in any method or technology for storage of information such as computer readable instructions, data structures, program modules, or other data. As defined herein, computer readable media do not include communication media in the form of modulated data signals, such as carrier waves, or other transmission mechanisms. In various embodiments, a non-transitory machine-readable storage medium having stored thereon instructions (in compressed or uncompressed form) may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/ machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be Internet download.

The transaction engine 202 may include an account management module 210, a transaction management module 212, a transaction token module 214, a transaction retrieval module 216, a payment module 218, a promotion module 220, a metrics module 222, and an inventory management module 224. The transaction engine 202 may further include a data store 226. The data stored 226 may store merchant accounts 228, customer accounts 230, a transaction database 232, a promotion database 234, a transaction token database 236, and a metrics database 238.

The account management module 210 may enable merchants, such as the merchant 108, to create the merchant accounts 228. The merchant 108 may establish a corresponding merchant account by providing registration information to the account management module 210 via an electronic device, such as the mobile device 106. The registration information may include a merchant name, a business name, a business address, business contact information, a login name, a password, and/or so forth. The merchant account may be a payment receivable account that enables the merchant 108 to receive payments for products or services. In various embodiments, the account management module 210 may provide authentication functions that control access to the merchant accounts 228.

Additionally, the account management module 210 may also enable customers, such as the customer 112, to create the customer accounts 230. The customer 112 may establish a corresponding customer account by providing registration information to the account management module 210 via an electronic device, such as the client device 110. The registration information may include a customer name, a customer address, customer contact information, a login name, a password, and/or so forth. Each of the customer accounts 230 may also include account access information for one or more financial accounts that a corresponding customer provided for paying transactions. In various embodiments, the account management module 210 may provide authentication functions that control access to the customer accounts 230.

The transaction management module 212 may receive transactions from merchant applications on mobile devices. For example, the transaction management module 212 may receive the transaction 124 from the merchant application 126 that is on the mobile device 106. Each of the transactions may include transaction details, such as a purchase order number, a name of each item purchased, a description of each item, a cost of each item, a number of each item purchased, a purchase total, a merchant name, an identifier of a payment receivable account of the merchant 108, and/or so forth. The transaction management module 212 may store the transaction details of each transaction as a corresponding database entry in the transaction database 232.

The transaction management module 212 may also use the transaction token module 214 to generate a unique transaction token for each transaction. The transaction token module 214 may track the transaction tokens that are generated for transactions in the transaction token database 236. Each transaction token may include a unique string of one or more alphanumeric symbols that are generated sequentially, randomly, or pseudo-randomly by the transaction token module 214. By using the transaction token database 236, the transaction token module 214 may ensure that no one particular transaction token is used to represent multiple transactions. In other words, the transaction token module 214 may generate another transaction token for a transaction when the transaction token 214 determines that a generated transaction token is already in use. In some instances, a specific transaction token tracked in the transaction token database 236 may be released for use with another transaction when an original transaction associated with the specific transaction token is permanently removed from the transaction database 232.

Once a transaction token is generated for a particular transaction, the transaction management module 212 may stored the transaction token in a corresponding data entry that holds the particular transaction. The transaction management module 212 may further send the transaction token to the mobile device that sent the corresponding transaction. For example, the transaction management module 212 may send the transaction token 128 to the merchant application 126 on the mobile device 106, in exchange for the transaction 124. In some embodiments, the transaction management module 212 may send the transaction token 128 as an encrypted token that may be decrypted by the merchant application 126 on the mobile device 106. In certain embodiments, the transaction management module 212 may be further directed by a merchant via a merchant application to remove one or more corresponding transactions of the merchant from the transaction database 232.

The transaction retrieval module 216 may search for transaction details in the transaction database 232 that match transaction tokens that are received from customer applications of client devices. For example, the transaction retrieval module 216 may receive an encrypted transaction token 128. Accordingly, the transaction retrieval module 216 may first decrypt a transaction token. Subsequently, the transaction retrieval module 216 may use the decrypted transaction token to search for matching transaction details in the transaction database 232. After locating the matching transaction details, the transaction retrieval module 216 may send the transaction details to the customer application on the client device via the network 118. For example, the transaction retrieval module 216 may retrieve the transaction details 136 from the transaction database 232 for the transaction token 128. Subsequently, the transaction retrieval module 216 may send the retrieved transaction details 136 to the customer application 130.

The payment module 218 may arrange for the transfer of payment funds from a payment service provide to an account of a merchant in the merchant accounts 228. For example, when the payment request 138 is received, the payment module 218 may send a payment transfer request 140 to the payment service provider 116. The payment transfer request 140 may include the account access information of a designated financial account of the customer 112 stored on the servers 114 of the payment service provider 116, the identity of the customer 112, the contact information of the customer 112, an amount to be paid, the identifier of the payment receivable account of the merchant, and/or so forth. The payment module 218 may obtain the amount to be paid from the transaction details 136.

In some instances, the customer 112 may also have arranged to have funds deposited in a corresponding customer account, such as one of the customer accounts 230. Thus, in such instances, the payment module 218 may alternatively or concurrently arrange for the transfer of payment funds stored in the customer account of the customer 112 to one of the merchant accounts 228 to pay for a purchase. Likewise, the customer 112 may have credits or points stored in the corresponding customer account. The credits or points may have monetary value that is assigned by transaction service provider 102. The customer 112 may have received the credits or points in various ways. For instance, the customer may have received the credits or points as a part of promotion provided by the transaction service provider 102, as a compensation from the transaction service provider 102, as a reward from the transaction service provider 102 for completing a particular task (e.g., service signup bonus), and/or so forth. Accordingly, the payment module 218 may also arrange for the payment of monetary value corresponding to the credits or points to a merchant account of the merchant 108 to partially or completely pay for a purchase. Accordingly, in at least one embodiment, the payment module 218 may arrange for payment to a merchant account from multiple fund sources as directed by the customer 112.

In various embodiments, the payment module 218 may also collect a service fee for each arrangement of a payment transfer from a payment service provider and/or a customer account to a merchant on behalf of a customer. The service fee may be a fixed fee per transfer, a portion of the total purchase price for a corresponding purchase paid by the transfer, a periodic fee (e.g., monthly, annual, etc.) for any number of transfers in a predetermined period of time, and/or so forth. The service fee for each transfer may be paid by a corresponding customer, a corresponding merchant, or apportioned between the corresponding customer and the corresponding merchant. In this way, the transaction service provider 102 may have a revenue stream for facilitating transactions between merchants and customers.

The promotion module 220 may distribute promotions that are designed by merchants, such as the merchant 108, to promotion recipients. In at least one embodiment, the merchant 108 may use the merchant application 126 on the mobile device 106 to designate a item in the merchant's inventory that is to be discount as part of a promotion. The promotion may also include an amount of the discount, description of the item that is discounted, the promotion start and end dates, terms of the promotion, identity of the merchant that is offering the promotion, and/or the like. The merchant 108 may use the merchant application 126 to upload the promotion to the transaction engine 202 for storage in the promotion database 234.

The merchant 108 may use the merchant application 126 to command the promotion module 220 to distribute a promotion to the promotion recipients. The promotion offers may be distributed via emails, text messages, phone calls, facsimiles, postal mails, flyers, and/or so forth. However, the promotion module 220 may also perform distributions of promotions as notification packages to the customer applications on the client devices. Each notification package may enable a customer application to alert a customer of a location of the merchant on a graphical display, display additional details regarding the offer, and automatically apply the discount provided by the promotion when a customer purchases a discounted item using the customer application. In some embodiments, the promotion recipients may include previous customers of the merchant, which are consumers that have purchased products or services from the merchant 108. In other embodiments, the promotion recipients may alternatively or concurrently include consumers who have signed up to receive promotions from the merchant 108.

The metrics module 222 may generate the metrics related to the sales of items by merchants or the effect of promotions provided by the merchants. A merchant may use a merchant application on a mobile device to request the metrics module 222 to provide different metrics. For example, the merchant 108 may use the merchant application 126 on the mobile device 106 to request the metrics. In turn, the metrics module 222 may analyze transaction histories and/or promotion histories of items that are sold by the merchant 108 and generate metrics that may be returned to the mobile device 106.

The metrics may include statistics such as the number of each item sold, the amount of profit generated for each sale, trends in sales or profits for the sale of each item, and/or so forth. These statistics may be displayed for various time periods, such as on a daily, weekly, monthly, and/or yearly basis. Such statistics may enable a merchant to determine which items are popular, which items generate the most profit, etc., and the merchant may manage an inventory of the products accordingly. The metrics module 222 may generate the metrics using at least the data stored in the merchant accounts 228, customer accounts 230, and/or transaction database 232, as well data inputs from other applications (e.g., a calendar application, a weather application, and/or so forth).

In other embodiments, the metrics may include a sale conversion rate that each promotion pertaining to one or more items is able to provide in a predetermined time period. The sale conversion rate may measure the number of sale conversions per distributions of a promotion (e.g., 20 sales per each 100 distributions of a promotion). The metrics may also include a comparison of the number of sales during a promotional period versus a comparable benchmark period when no discount promotion was distributed. In this way, the true effect of a promotion may be determined. In some examples, the metrics may also include a comparison of sale conversions rates for different discounts on the same item. For example, the metrics may show that an increase from a 5% percent discount to a 15% discount resulted in 40% additional increase in the sale conversion rate, while an increase from a 15% discount to a 25% discount only resulted in a 10% additional increase in the sale conversion rate.

In other examples the metrics may also include a comparison of number of sales for an identical promotion that is offered for different promotional time periods. For example, the metrics may show that the number of sales of an item from a five-day promotion period did not differ significantly from the number of sales in a two-day promotion period as a majority of sales occurred within the first two days in each promotion period. In additional examples, other metrics may also compare sale numbers of items or sale conversion rates of promotions to other factors, such as different times of the day, different days in a week, different weeks in a month, seasonal changes, weather patterns, and/or other factors, to determine sale patterns and trends. Accordingly, the metrics offered by the metrics module 222 may enable a merchant to determine when to offer a promotion, how much discount to offer in the promotion, a most profitable time in a day or a time period in a month or year to offer the promotion, a length of the promotion period for the promotion, and/or so forth.

The inventory management module 224 may monitor the sales history for each item that is sold by a particular merchant to generate inventory reports. A merchant may use a merchant application on a mobile device to request the inventory management module 224 to provide inventory status. For example, the merchant 108 may use the merchant application 126 on the mobile device 106 to request inventory status for items that are sold by the merchant 108. In turn, the metrics module 222 may analyze transaction histories of items that are sold by the merchant 108 to generate inventory status reports that may be returned to the mobile device 106. In at least one embodiments, an inventory status report may display a number of an item sold by a merchant, the remaining numbers of the item in the inventory of a merchant, and/or a reminder for the merchant to order additional quantity of the item. Accordingly, a merchant may use the inventory status report to manage the stocks of the items for sale.

The data store 226 may store data that is received and processed by the various modules of the transaction engine 202. As described above, the data store 226 may store the merchant accounts 228, the customer accounts 230, the transaction database 232, and the promotion database 234. Additionally, the metrics module 222 may store the metrics that are generated for various merchants in the metrics database 238. The data store 226 may further store data and intermediate products that are generated and/or used by the various modules, such as order merchant affiliation data, announcements, messages, and/or the like.

The mobile device 106 may include processor(s) 240 and memory 242. The memory 242 may include computer readable media. Computer readable media may include volatile and non-volatile, removable and non-removable media implemented in any method or technology for storage of information such as computer readable instructions, data structures, program modules, or other data. As defined herein, computer readable media do not include communication media in the form of modulated data signals, such as carrier waves, or other transmission mechanisms. In various embodiments, a non-transitory machine-readable storage medium having stored thereon instructions (in compressed or uncompressed form) may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be Internet download.

The mobile device 106 may also include a network interface 244, a proximity interface 246, and a user interface 248. The network interface 244 may include wireless and/or wired communication components that enable the mobile device 106 to transmit data to and receive data from other devices via the network 118. For example, the network interface 244 may include a cellular communication transceiver, a Wi-Fi transceiver, a wired network interface transceiver, and/or so forth.

The proximity interface 246 may include short range communication components that function independently of the network 118. In some embodiments, the proximity interface 246 may include a speaker that transmits sound waves and/or a microphone that receives sound waves. The sound waves may be modulated by the merchant application 126 to carry data. For example, the sound waves may encapsulate a transaction token, such as the transaction token 128, that the merchant application 126 desires to transmit to a customer application. The customer application may be the customer application 130 on the client device 110. In such an example, the merchant application 126 may use the speaker to broadcast the encapsulated transaction token 128 to a microphone of the client device 110. In some embodiments, the merchant application 126 may encrypt the transaction token 128 for transmission by the speaker.

In other embodiments, the proximity interface 246 may include a light-based communication transceiver (e.g., an infrared transceiver) or a radio signal-based transceiver (e.g., Bluetooth transceiver) that is capable of transmitting and receiving data. In such embodiments, such transceivers may be used by the merchant application 126 of the mobile device 106 to transmit transaction tokens to customer applications, such as the customer application 130. The transaction tokens may be transmitted as encrypted tokens or unencrypted tokens.

The user interface 248 may enable a user to provide inputs and receive outputs from the mobile device 106. The user interface may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

In additional embodiments, rather than using the proximity interface 246 to transmit information, the merchant application 126 on the mobile device 106 may use the visual display of the user interface 248 to show an image that encapsulates the transaction token. For example, the image may be a matrix code, such as a QR code, an Aztec code, a MaxiCode, and/or so forth. In this way, the matrix code shown by the visual display of the mobile device 106 may be read by a camera of the client device 110.

The memory 242 may store an operating system 250 and the merchant application 126. The operating system 250 may include components that enable the mobile device 106 to receive data via various inputs via the user interface 248, process the data using the processor(s) 240 to generate output. The operating system 250 may further include one or more components that present the output, including display data using the user interface 248, store data in memory, transmit data to another electronic device, and/or so forth. Additionally, the operating system 250 may include other components that perform various other functions generally associated with an operating system, such as providing an execution environment for applications that are installed on the mobile device 106.

The merchant application 126 may use the execution environment provided by the operating system 250 to interface with a user and other devices and servers. Accordingly, the merchant application 126 may perform various functions that are described herein, such as encrypting transaction tokens, as well as enabling a merchant to create transactions, designate promotions, request and review sales metrics, manage inventory, and/or so forth. However, in some embodiments, the merchant application 126 may be replaced with a web browser, and the functions performed by the customer application 130 may instead be performed by modules on the transaction engine 202 that receive inputs and present outputs to the merchant 108 via the web browser.

Similarly, the client device 110 may include processor(s) 252 and memory 254. The memory 254 may include computer readable media. Computer readable media may include volatile and non-volatile, removable and non-removable media implemented in any method or technology for storage of information such as computer readable instructions, data structures, program modules, or other data. As defined herein, computer readable media does not include communication media in the form of modulated data signals, such as carrier waves, or other transmission mechanisms. In various embodiments, a non-transitory machine-readable storage medium having stored thereon instructions (in compressed or uncompressed form) may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be Internet download.

The client device 110 may also include a network interface 256, a proximity interface 258, and a user interface 260 that function similarly as their counterparts in the mobile device 106. For example, the proximity interface 258 may include short range communication components that function independently of the network 118. In some embodiments, the proximity interface 258 may include a speaker that transmits sound waves and/or a microphone that receives sound waves. The microphone may enable the client device 110 to receive encrypted or unencrypted transaction tokens in the form of modulated sound waves.

In other embodiments, the proximity interface 258 may include a light-based communication transceiver (e.g., an infrared transceiver) or a radio signal-based transceiver (e.g., Bluetooth transceiver) that is capable of transmitting and receiving data. In such embodiments, such transceivers may be used by the customer application 130 to receive encrypted or unencrypted transaction tokens that are transmitted by the mobile device 106.

The user interface 260 may enable a user to provide inputs and receive outputs from the client device 110. Accordingly, the user interface 260 may be functionally similar to the user interface 248 of the mobile device 106. The memory 254 may store an operating system 262 and the customer application 130. The operating system 262 may perform functions that are similar to the functions performed by the operating system 250 of the mobile device 106. Accordingly, the operating system 262 may provide an execution environment for the customer application 130.

The customer application 130 may use the execution environment provided by the operating system 262 to interface with a user and other devices and servers. As such, the customer application 130 may perform various functions that are described herein, such as decrypting transaction tokens and retrieve transaction details, as well as enabling a customer to review the transaction details, initiate payments for transactions, receiving promotions, redeem promotions, and/or so forth. For example, the user interfaces 248 may include a camera that is used by the customer application 130 to receive a matrix code that represents a transaction token. In some embodiments, the customer application 130 may be replaced with a web browser, and the functions performed by the customer application 130 may instead be performed by modules on the transaction engine 202 that receive inputs and presents output to the customer 112 via the web browser.

Example User Interfaces

Figure 3:
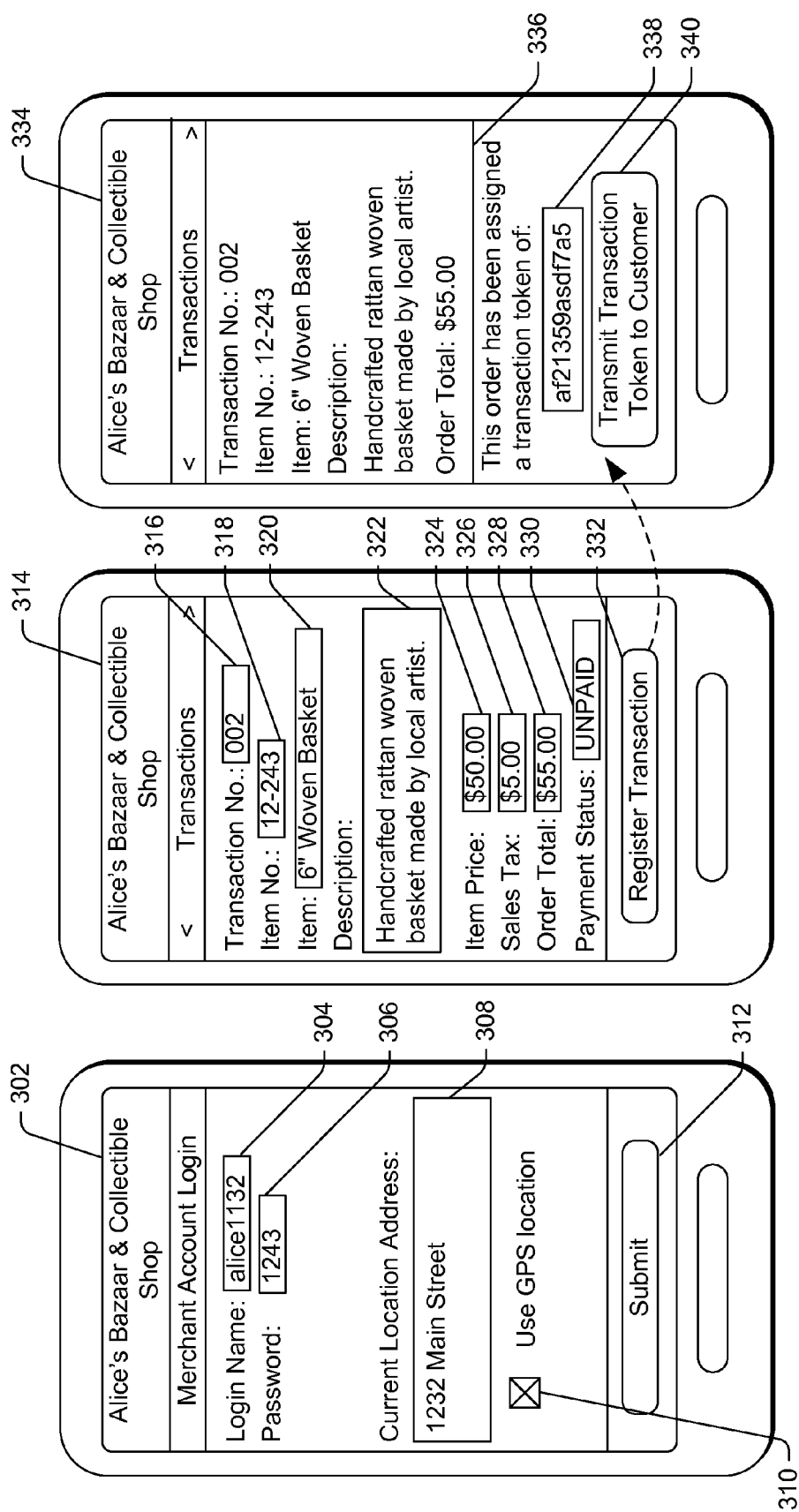
FIG. 3 shows illustrative user interface pages displayed on a mobile device that enable a merchant to provide a transaction token generated for a transaction to a client device of a customer.

FIG. 3 shows illustrative user interface pages displayed on the mobile device 106 that enable the merchant 108 to provide the transaction token 128 generated for the transaction 124 to the client device 110 of the customer 112. The user interface pages may be displayed by the merchant application 126 of the mobile device 106.

The merchant application 126 may display a user interface page 302 that enables the merchant 108 to log onto the transaction engine 202. In at least one embodiments, the user interface page 302 may prompt the merchant 108 to enter a login name into a login name field 304 and a password into a password field 306 to authenticate to the account management module 210. Thus, assuming that the login name and password are authenticated, the account management module 210 may grant the merchant 108 access to a corresponding merchant account of the merchant accounts 228.

In some embodiments, the user interface page 302 may also include an input field 308 that enables a merchant to enter a current location of the merchant 108. As further described below, the transaction engine 202 may provide the current location of the merchant 108 to customer applications on mobile devices, so that customers may locate the merchant 108. In at least one embodiment, the user interface page 302 may include a checkbox 310 that enables the merchant to use a global positioning system (GPS) function of the mobile device 106 to automatically report the current location of the merchant 108. Once the merchant 108 has entered the desired information into the user interface page 302, the merchant 108 may use the submit option 312 to transmit the information to the transaction engine 202 of the transaction service provider 102.

The merchant application 126 may display a user interface page 314 that enables the merchant 108 to enter transaction details of a transaction request for one or more items, so that the transaction request may be submitted to the transaction engine 202. In some embodiments, the user interface page 314 may include a transaction identifier field 316, an item number field 318, an item name field 320, and an item description field 322. The transaction identifier field 316 may enable the merchant 108 to enter a transaction number for the transaction request. The item number field 318 may enable the merchant 108 to enter an item number that the merchant 108 uses to track the item. The item description field 322 may enable the merchant 108 to enter an item description for the item.

The user interface page 314 may further include an item price field 324, a sales tax field 326, and an order total field 328. The item price field 324 may enable the merchant 108 to enter a price for the item. The sales tax field 326 may enable the merchant 108 to enter any applicable sales tax amount. The order total field 328 may enable the merchant 108 to enter a total of the item price and sales tax. In at least one embodiment, one or more of the fields described above may be automatically populated by the merchant application 126 based on information entered into another field. For example, the item number field 318 may include a pull down list of item numbers. Once the merchant 108 has selected an item number from the list, the merchant application 126 may automatically populate the remaining fields based on information that is stored in an item information database in the memory 242 of the mobile device 106. In embodiments in which the transaction request is for an order that includes multiple items, there may be multiple item price fields, multiple item number fields, and multiple item description fields. As such, the above fields and field names as shown in the user interface page 314 are illustrative rather than limiting.

The user interface page 314 may additionally include a payment status field 330 that is used by the merchant application 126 to indicate whether payment has been received for the transaction. For example, the payment status field 330 may change from "unpaid" to "paid" when the merchant application 126 receives a notice of payment 144 (or notice of payment approval) from the payment module 218 of the transaction engine 202.

Accordingly, once the merchant 108 has entered the desired information into the user interface page 314, the merchant 108 may use the register transaction option 332 to transmit the transaction request to the transaction engine 202 of the transaction service provider 102.

The merchant application 126 may display a user interface page 334 after submitting a transaction request to the transaction engine 202 and receiving a transaction token, such as the transaction token 128. The user interface page 334 may include a transaction detail portion 336 that displays details regarding a transaction that resulted from the transaction request. The user interface page 334 may further include a transaction token field 338 that displays a transaction token for the transaction. The transaction token may be assigned by the transaction token module 214 of the transaction engine 202. Accordingly, the merchant 108 may use a token transmit option 340 to transmit the transaction token to a customer application that is on a client device. In various embodiments, the mobile device 106 may use the proximity interface 246 to perform the transmission.

Figure 4:
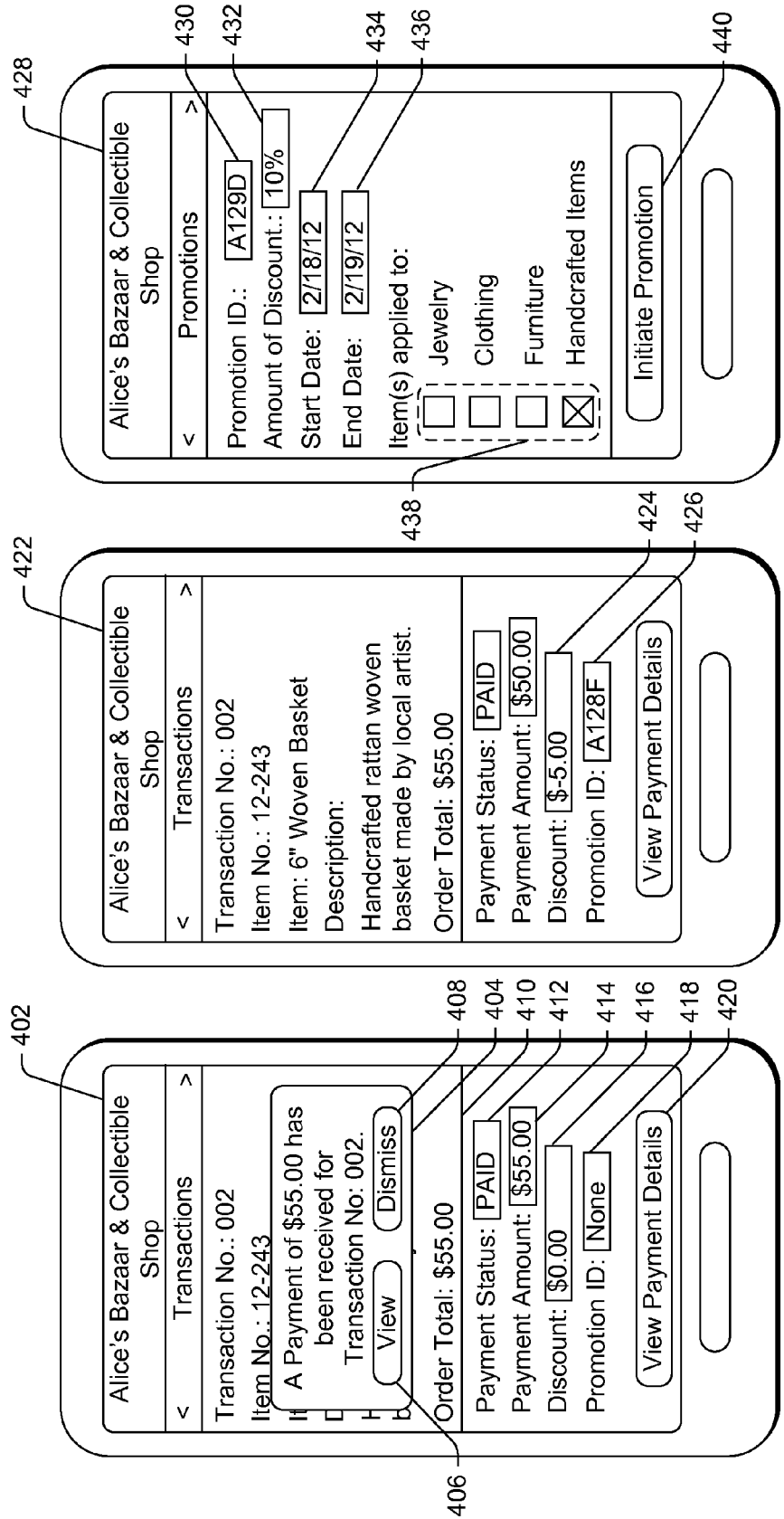
FIG. 4 shows illustrative user interface pages displayed on a mobile device of a merchant to inform the merchant that a customer has paid for a transaction or enable the merchant to initiate promotions for items sold by the merchant.

FIG. 4 shows illustrative user interface pages displayed on the mobile device 106 of the merchant 108 to inform the merchant 108 that a customer has paid for a transaction or to enable the merchant to initiate promotions for items sold by the merchant. The user interface pages may be displayed by the merchant application 126 of the mobile device 106.

The merchant application 126 may display a user interface page 402 when a payment for a transaction is received from a customer. In some embodiments, the merchant application 126 may display an alert message 404 when a payment is received for the transaction, regardless of the user interface page that the merchant 108 is currently viewing. Accordingly, the merchant 108 may access the user interface page 402 by selecting the view option 406 of the alert message 404. On the other hand, the user may select the dismiss option 408 to close the alert message 404.

In at least one embodiment, user interface page 402 may include a transaction description portion 410 that displays a summary of the paid transaction, as well as a payment status field 412, a payment amount field 414, a discount field 416, and a promotion identifier field 418. The payment status field 412 may indicate that transaction has been paid. The payment amount field 414 may indicate the amount of the payment. The discount field 416 may indicate the amount of discount that was applied, and the promotion identifier field 418 may indicate the identifier of a particular promotion that provided the discount.

The user interface page 402 may further include a view detail option 420. The view detail option 420 may enable the merchant 108 to access an additional user interface page that provide further details regarding the transaction. For example, such further details may include the identity of the customer that purchased one or more items through the transaction, the method of payment (e.g., credit card, debit card, etc.), a transaction history of the customer, including other items purchased by the customer in the past, and/or so forth.

The merchant application 126 may display a user interface page 422 that is a variation of the user interface page 402 when the customer redeemed a coupon offered by the merchant 108. As shown, the user interface page 422 may differ from the user interface page 402 in that the discount field 424 shows the amount of the discount, and the promotion identifier field 426 shows an identifier of the promotion that provided the discount.

The merchant application 126 may display a user interface page 428 that enables the merchant 108 to initiate a promotion. The promotion may provide discounts on one or more items offered for sale by the merchant 108. As such, the user interface page 428 may include a promotion identifier field 430, a discount amount field 432, a start date field 434, an end date field 436, and item selection checkboxes 438.

The promotion identifier field 430 may show an identifier of the current promotion. In various embodiments, the promotion identifier field 430 may be manually assigned by the merchant 108 or automatically assigned by the merchant application 126. The discount amount field 432 may enable the merchant 108 to fill in the amount of the discount. The discount may be an actual monetary amount or a percentage of the purchase price of an item. In some embodiments, the discount amount field 432 may include a pull down list of possible discounts so that the merchant 108 may select the desired discount. The start date field 434 and the end date field 436 may control the duration that the promotion is in effect.

The item selection checkboxes 438 may be used by the merchant 108 to select one or more items to which the promotion pertains. In some embodiments, each of the item selection checkboxes 438 may correspond to a group of items that are offered for sale by the merchant 108, such as by category, by price range, by utility, by inventory status, or by any other suitable grouping. In other embodiments, each of the item selection checkboxes 438 may pertain to a specific item that is offered for sale by the merchant 108. Once the merchant 108 has designed a promotion using the user interface page 428, the merchant 108 may use the initiate promotion option 440 of the user interface page 428 to send the promotion offer to the promotion module 220 of the transaction engine 202. The promotion module 220 may then distribute the promotion offer to the promotion recipients.

Figure 5:
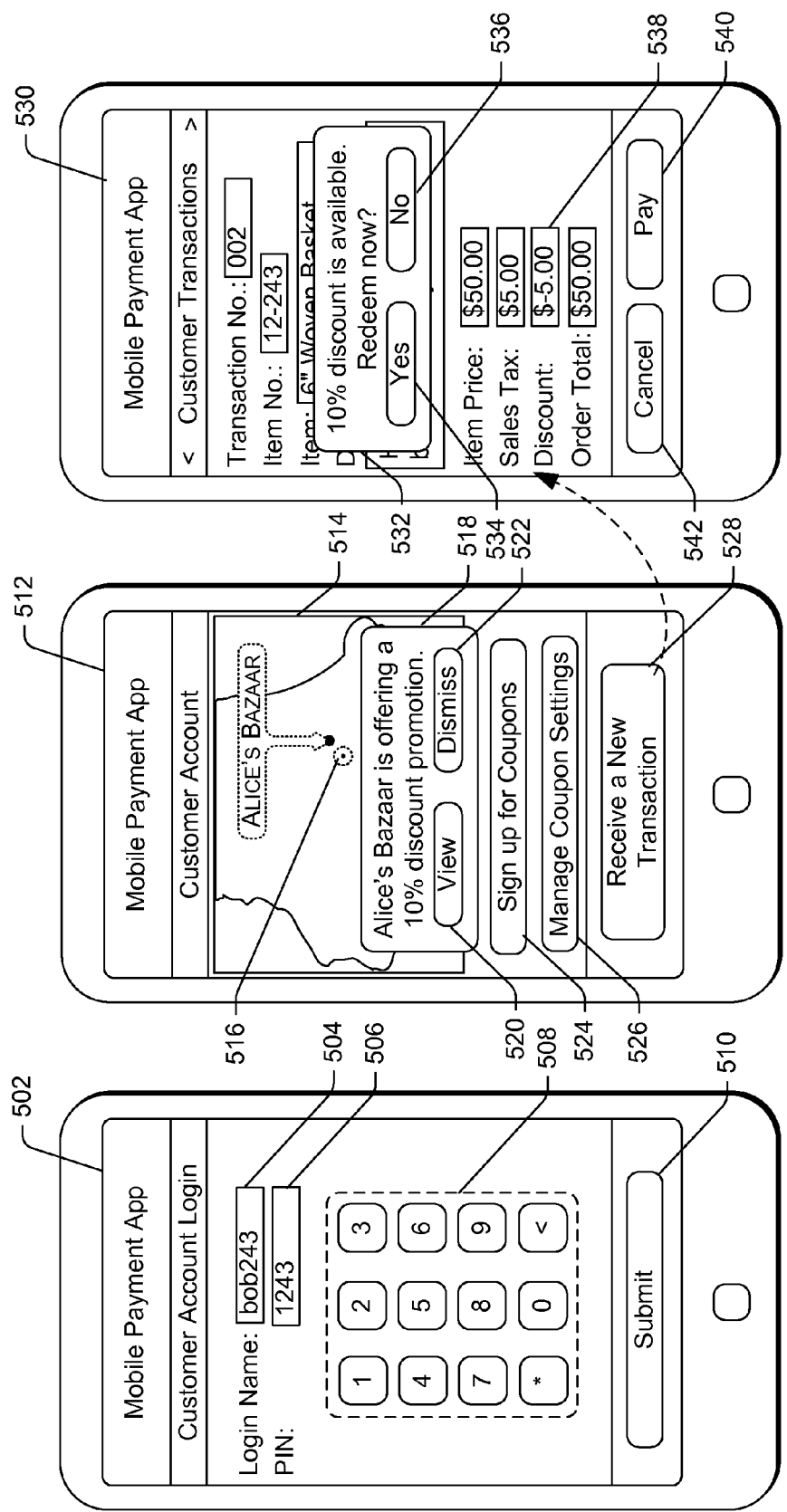
FIG. 5 shows illustrative user interface pages displayed on a client device that enable the customer to pay for one or more items that are purchased from a merchant using a customer account stored on a transaction engine.

FIG. 5 shows illustrative user interface pages displayed on the client device 110 that enable the customer 112 to pay for one or more items that are purchased from a merchant using a customer account stored on a transaction engine. The user interface pages may be displayed by the customer application 130 on the client device 110.

The customer application 130 may display a user interface page 502 that enables the customer 112 to access a corresponding customer account. Once the customer 112 has access to the corresponding customer account, the customer 112 may have the ability to use such an account to locate merchants, view promotions, and pay/or for items purchased from merchants.

The user interface page 502 may include input fields, such as a login name field 504 and a password field 506, which enable the customer 112 to enter authentication credentials for accessing the corresponding customer account. In some embodiments, the password field 506 may be a personal identification number (PIN) field. In such embodiments, the user interface page 502 may provide a virtual keypad 508 that enables the customer 112 to touch the screen of the client device 110 to enter a PIN. The use of the virtual keypad 508 to enter a PIN may greatly speed up the login process, thereby making the overall purchase experience more convenient for the customer 112. Once the customer 112 has entered the authentication credentials, the customer 112 may activate the submit option 510 to cause the customer application 130 to authenticate the customer 112 with the account management module 210 on the transaction engine 202. It will be appreciated that while the user interface page 502 is illustrated as having the login name field 504 and the password field 506, one or more other authentication credential input fields may be alternatively or concurrently present on the user interface page 502 in other embodiments.

Once the customer 112 has been authenticated by the account management module 210, the customer application 130 may display the user interface page 512. The user interface page 512 may include a map portion 514 that displays the location of one or more merchants that are offering promotions subscribed to by the customer 112. In some instances, the map portion 514 may also display a current location 516 of the client device 110 in relation to the location of the one or more merchants. In this way, the customer 112 may be enticed to visit the one or more merchants. In at least one embodiment, the map portion 514 may be further filtered to display one or more specific merchants or one or more specific categories of merchants that are offering promotions.

Further, the user interface page 512 may display an alert message 518 that alerts the customer 112 to a promotion from a merchant. In some embodiments, the alert message 518 may be displayed on the user interface page 512 when the client device 110 is within a predetermined range of the merchant that is offering the promotion. Such an alert message 518 may serve as a special enticement to the customer 112 to take advantage of the deal. Accordingly, the customer 112 may use the view option 520 to view additional details regarding the promotion, or use the dismiss option 522 to dismiss the alert message 518.

The user interface page 512 may include a coupon sign up option 524 and a coupon management option 526. The coupon sign up option 524 may enable the customer 112 to subscribe to promotions from one or more merchants. For example, the coupon sign up option 524 may bring up a list of selectable merchants, and the customer 112 may view and select merchants that are of interest to the customer 112. Once the customer 112 has selected a merchant, the customer application 130 may automatically receive promotion notification packages from the merchant for storage in the memory 254, so that the customer application 130 may alert the customer 112 or apply the coupons in the promotion notification packages when the customer 112 purchases corresponding items.

The coupon management option 526 may enable the customer 112 to manage coupon settings with respect to the merchants that are offering promotions. For example, the coupon management option 526 may enable the customer 112 to unsubscribe from merchants that are offering promotions, change a frequency at which the promotions are received, select specific types of promotions to receive (e.g., coupons that offer savings that are greater than a predetermined percentage, coupons for specific items, etc.). The coupon management option 526 may further include a setting that enables the customer 112 to decline to reveal a current location of the client device 110 to the transaction engine 202. In this way, the customer may forego the reception of alert messages (e.g., alert message 518) that describe promotions from proximate merchants in the interest of protecting privacy. The customer application 130 may store the promotions in the memory 254 for subsequent use.

In other embodiments, the user interface page 512 may include a new transaction option 528. The customer 112 may activate the new transaction option 528 to cause the customer application 130 to receive a transaction token of a transaction. For example, the transaction token may be the transaction token 128 for the transaction 124. In at least one embodiment, the customer may activate the new transaction option 528 after the merchant 108 has activated the token transmit option 340 of the user interface page 334 provided by the merchant application 126. Once activate, the customer application 130 may receive a transaction token, and then use the transaction token to obtain the corresponding transaction details from the transaction engine 202.

The customer application 130 may display a user interface page 530 once the customer application 130 has received the transaction details for a transaction from the transaction engine 202, such as the transaction details 136 for the transaction 124. The transaction details display by the user interface page 530 may include descriptions of the item that is to be purchased via the transaction, as well as cost details, such as purchase price, applicable sales tax, purchase total, etc. In some embodiments, the customer application 130 may automatically apply any coupon that is available from the merchant 108 during a transaction. The coupon may be stored on the client device 110 as a part of a promotion notification package.

In other embodiments, the customer application 130 may provide a prompt message 532 that asks the customer 112 whether to apply an applicable promotion to the transaction. If the customer 112 desires to apply the promotion, the customer may select an accept option 534 of the prompt message 532. However, if the customer 112 declines the application of the promotion, the customer 112 may select a decline option 536. The customer application 130 may display any discount that is applied in a discount field 538 of the user interface page 530. Once the customer 112 has reviewed the transaction and cost details, the customer 112 may use the pay option 540 to pay for the transaction. The activation of the pay option 540 may initiate a payment request, such as the payment request 138, which may eventually result in a payment service provider 116 paying for the transaction on behalf of the customer 112. Otherwise, if the customer 112 desires to abort the transaction, the customer may select the cancel option 542.

Figure 6:
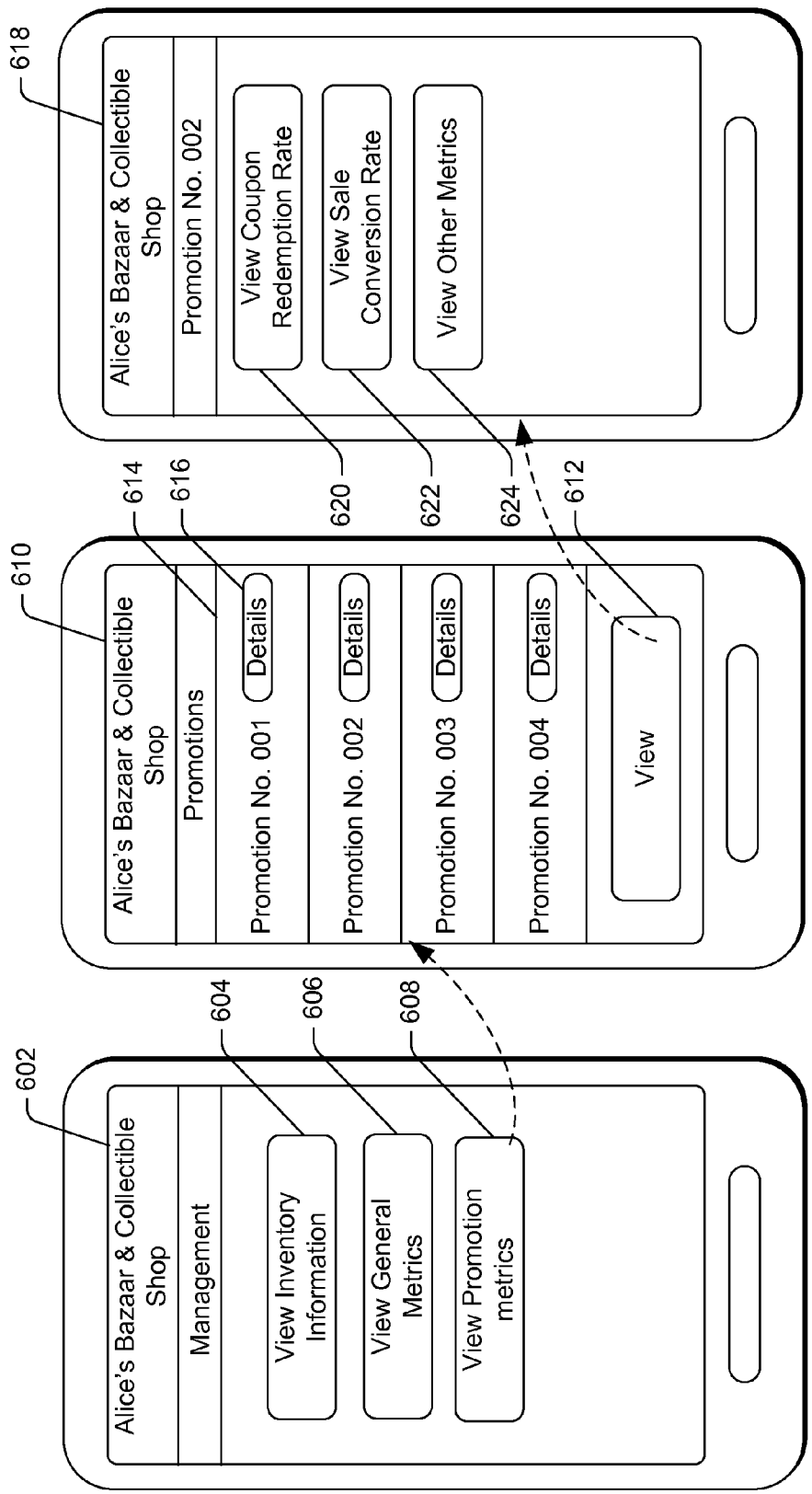
FIG. 6 is shows illustrative user interface pages displayed on a mobile device of a merchant that enable the merchant to use the transaction engine to generate metrics related to the sales of products or services by the merchant.

FIG. 6 is shows illustrative user interface pages displayed on the mobile device 106 of the merchant 108 that enable the merchant 108 to use the transaction engine to generate metrics related to the sales of products or services by the merchant. The merchant application 126 on the mobile device 106 may display a user interface page 602. The user interface page may include a view inventory option 604, a view general metrics option 606, and a view promotion metrics option 608. The merchant 108 may view the user interface page 602 following authentication by the account management module 210. The view inventory option 604 may enable the merchant 108 to view inventory data as generated by the inventory management module 224 of the transaction engine 202. For example, the merchant 108 may request inventory status for items that are sold by the merchant 108. In turn, the metrics module 222 may analyze transaction histories of items that are sold by the merchant 108 to generate inventory status reports that may be returned to the mobile device 106.

The view general metrics option 606 may be used by the merchant 108 to request that the metrics module 222 generate metrics pertaining to overall sales patterns. For example, the metrics may include statistics such as the number of each item sold, the amount of profit generated for each sale, trends in sales or profits for the sale of each item, and/or so forth. These statistics may be displayed for various time periods, such as on a daily, weekly, monthly, and/or yearly basis.

The view promotion metrics option 608 may be used by the merchant 108 to request that the metrics module 222 generate metrics that are related to each promotion. The selection of the view promotion metrics option 608 may cause the merchant application 126 to instantiate the user interface page 610. The user interface page 610 may show a list of promotion offers that the merchant 108 has implemented in the past. Accordingly, the merchant 108 may select a promotion from the list, then activate the view option 612 to view metrics related to the selected promotion. For example, the merchant 108 may select the promotion option 614, and then use the view option 612 to view associated metrics. In at least one embodiment, each of the promotion options may also include a details option that enables the merchant 108 to view additional details regarding the corresponding promotion. For example, the promotion option 614 may include the details option 616. The selection of the details option 616 may cause the merchant application 126 to display details such as the amount of the discount, description of the product that is discounted, the promotion start and end dates, terms of the promotion, etc.

Once the merchant 108 has selected a promotion offer and activated the view option 612, the merchant application 126 may display a user interface page 618. The user interface page 618 may include a coupon redemption rate option 620, a sale conversion rate option 622, and additional metrics option 624. The activation of each option may cause the merchant application 126 to send a corresponding metric request to the metrics module 222 of the transaction engine 202. In turn, the metrics module 222 of the transaction engine 202 may calculate metric results and return the results to the merchant application 126 for display. For example, the activation of the coupon redemption rate option 620 may cause the metrics module 222 to compute a coupon redemption rate for a particular promotion. Likewise, the activation of the coupon redemption rate option 620 may cause the metrics module 222 to compute a coupon conversion rate for a particular promotion.

The other metrics options 624 may be selected to cause the metrics module 222 to calculate one or more additional metrics related to the promotions. For example, such metrics may include a comparison of the number of sales during a promotional period versus a comparable benchmark period when no discount promotion was distributed. In another example, the metrics may also include a comparison of number of sales for an identical promotion that is offered for different promotional time periods.

Illustrative Operations

FIGS. 7-13 show illustrative processes 700-1300 for using a mobile device equipped with a merchant application to process transactions. Each of the processes 700-1300 is illustrated as a collection of steps in a logical flow diagram, which represents a sequence of operations that can be implemented in hardware, software, or a combination thereof. In the context of software, the steps represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, the processes 700-1300 are described with reference to the computing environment 100 of FIG. 1, however other environments may also be used.

Figure 7:
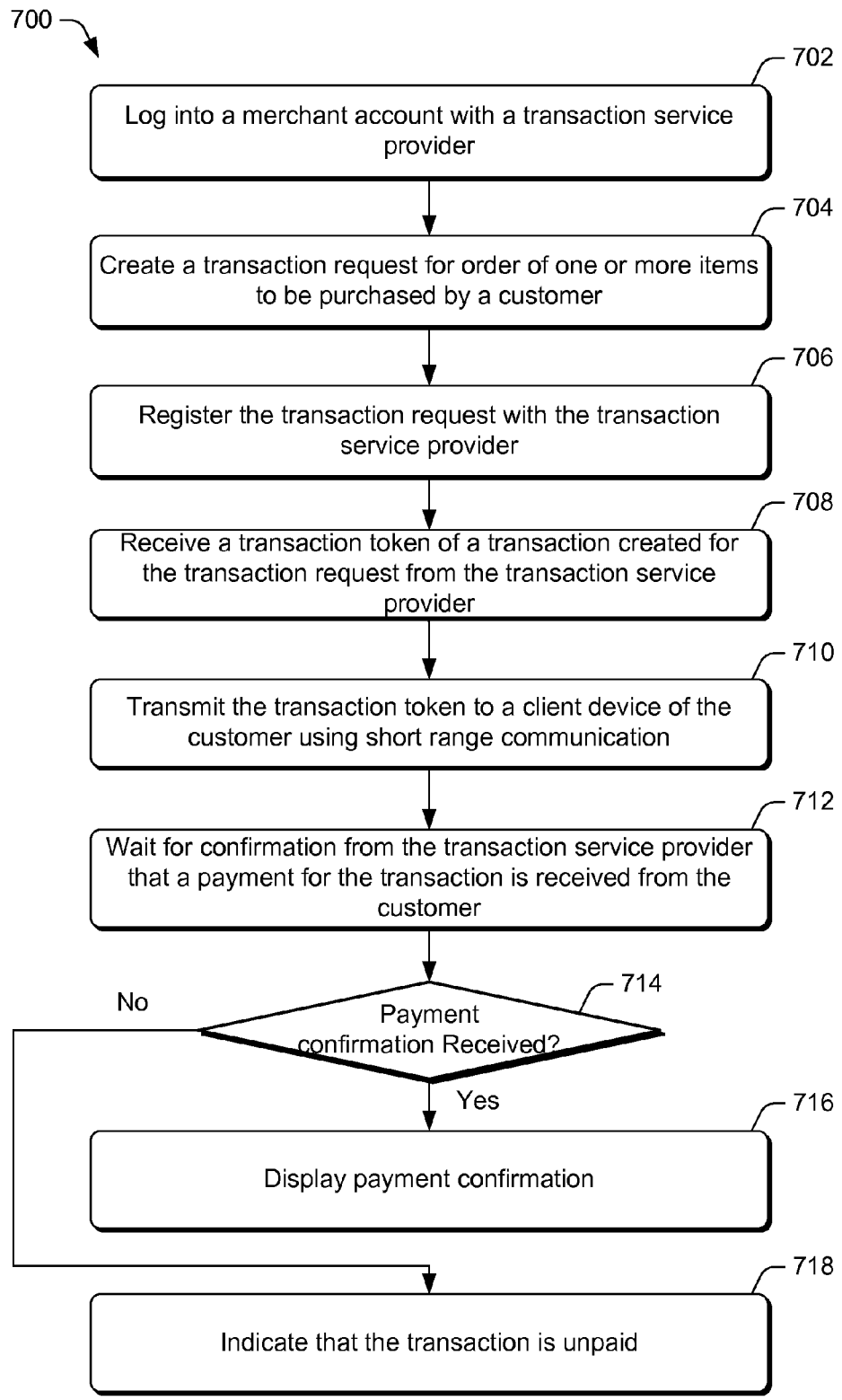
FIG. 7 is a flow diagram of an illustrative process for using a transaction token to facilitate the sale of one or more items offered by a merchant to a customer.

FIG. 7 is a flow diagram of an illustrative process 700 for using a transaction token to facilitate the sale of one or more items offered by a merchant to a customer. At block 702, the merchant 108 may use the merchant application 126 to log into a merchant account on a transaction service provider 102 that is previously established for the merchant 108. The merchant account may enable the merchant to initiate transactions, receive payments for products or services, initiate promotions, and receive metrics on sales and promotions.

At block 704, the merchant 108 may use the merchant application 126 to create the transaction request 122 for an order of one or more items purchased by the customer 112. The transaction request 122 may include transaction details 136. The transaction details 136 may include information such as a purchase order number, a name of each item purchased, a description of each item, a cost of each item, a number of each item purchased, a purchase total, a merchant name, an identifier of a payment receivable account of the merchant 108, and/or so forth.

At block 706, the merchant application 126 may register the transaction request 122 with the transaction service provider 102. In various embodiments, the registration may include the transmission of the transaction request 122 to the transaction management module 212 of the transaction engine 202.

At block 708, the merchant application 126 may receive a transaction token 128 for the transaction 124 that is created for the transaction request 122. The transaction token 128 may be a one-time use identifier that uniquely identifies the transaction 124. The transaction token 128 may be generated by the transaction token module 214 of the transaction engine 202.

At block 710, the merchant application 126 may transmit the transaction token 128 to the client device 110 of the customer 112 using a short range communication. The transfer may include the use of a light-based data transfer capability (e.g., infrared data transfer), an acoustic-based data transfer capability (e.g., sound wave-embedded data), an image-based data transfer capability (e.g., QR code-embedded data), or a radio signal-based data transfer capability (e.g., Bluetooth) of the mobile device 106. In some embodiments, the merchant application 126 may encrypt the transaction token 128 for transmission.

At block 712, the merchant application 126 may wait for confirmation from the transaction service provider 102 that a payment for the transaction is received from the customer. In at least one embodiment, the transaction service provider 102 may send a notice of payment 144 to the merchant application 126 when a payment for the transaction is received from the payment service provider 116 on behalf of the customer 112.

At decision block 714, if the merchant application 126 receives the notice of payment 144 ("yes" at decision block 714), the process 700 may proceed to block 716. At block 716, a payment confirmation may be displayed by the merchant application 126. Accordingly, the payment confirmation may prompt the merchant 108 to provide the one or more items to the customer 112. However, if the merchant application 126 does not receive the notice of payment 144 ("no" at decision block 714), the process 700 may proceed to block 718.

At block 718, the merchant application 126 may display an indication that the transaction is unpaid. In various embodiments, the merchant application 126 may receive a payment denied notice instead of the notice of payment 144 if the payment transfer request 140 from the transaction service provider 102 is denied by the payment service provider 116. For example, the payment service provider 116 may deny the payment transfer request 140 in instances in which the customer 112 has insufficient funds or credit in the one or more financial accounts, if the customer 112 has request to hold payment, if the payment service provider 116 suspects that the transaction 124 is fraudulent, and/or so forth.

In other embodiments, the transaction service provider 102 may send a notice of payment approval to the merchant application 126 at block 712, instead of the notice of payment 144. The transaction service provider 102 may send the notice of payment approval when a payment for the transaction is approved by the payment service provider 116, with the understanding that the payment is to be transferred to the merchant account of the merchant 108 at a later time. Thus, the notice of payment 144 described in blocks 714-718 may be substitute with the notice of payment approval.

Figure 8:
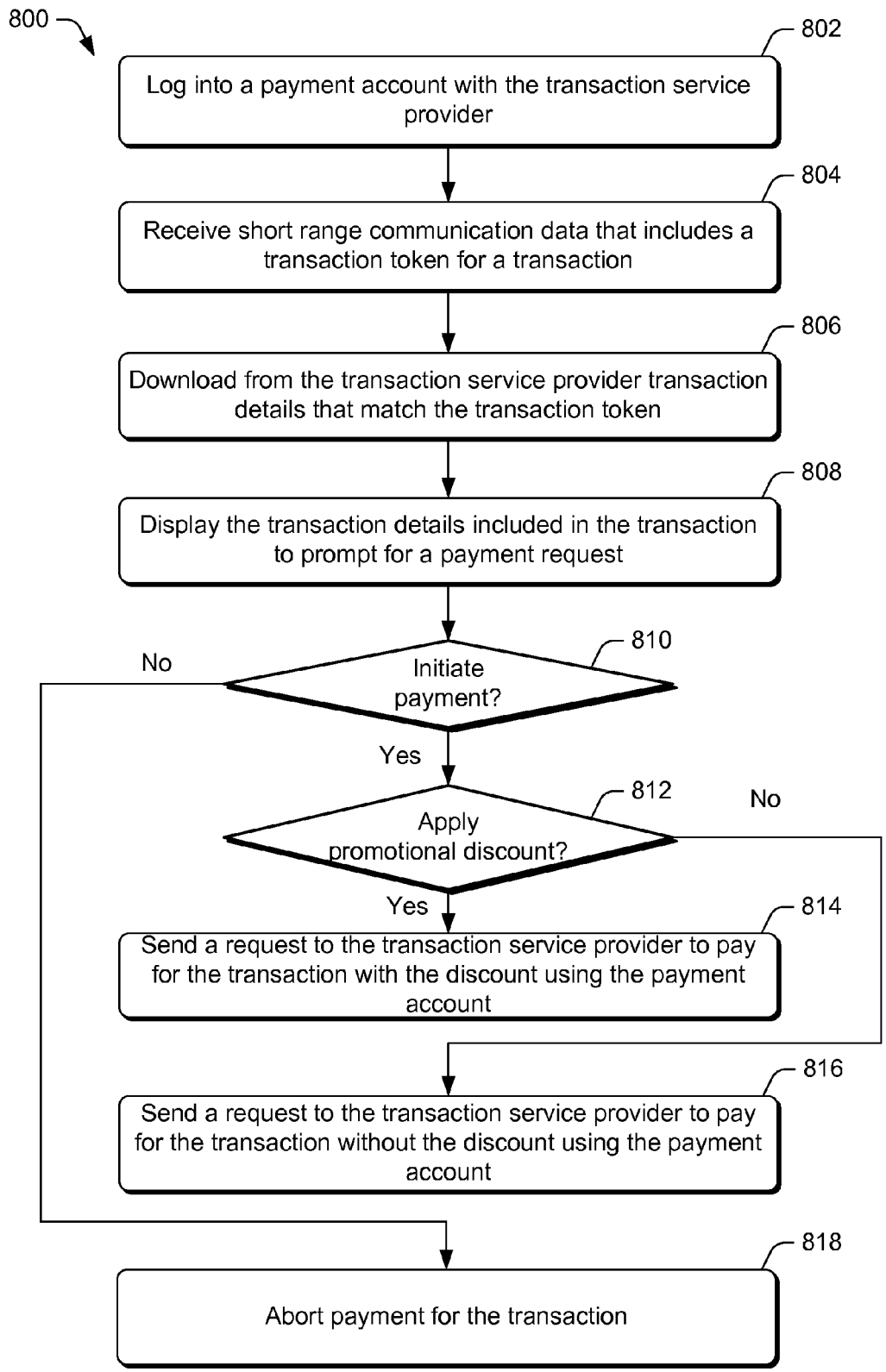
FIG. 8 is a flow diagram of an illustrative process for using a client device to obtain a transaction token from a merchant and pay for a transaction associated with the transaction token.

FIG. 8 is a flow diagram of an illustrative process 800 for using a client device to obtain a transaction token from a merchant and pay for a transaction associated with the transaction token. At block 802, the customer 112 may use the customer application 130 to log into a payment account with the transaction service provider 102 that is previously established for the customer 112. The payment account may enable the customer 112 to use a payment service provider 116 to pay for transactions. Following the login, the customer 112 may start a purchase that causes the merchant 108 to initiate the transaction request 122 for the transaction 124.

At block 804, the customer application 130 may receive short communication data that includes the transaction token 128 for the transaction 124. The transaction token 128 may be received by the customer application 130 via a light-based transfer capability (e.g., infrared data transfer), an acoustic-based data transfer capability (e.g., sound wave-embedded data), an image-based data transfer capability (e.g., QR code-embedded data), or a radio signal-based data transfer capability (e.g., Bluetooth) of the mobile device 106. In some embodiments, the customer application 130 may decrypt the received data to obtain the transaction token 128.

At block 806, the customer application 130 may download the transaction details 136 for the transaction 124 from the transaction service provider 102. In various embodiments, the customer application 130 may send a detail request 134 that includes the transaction token 128 to the transaction retrieval module 216 on the transaction engine 202. In turn, the transaction retrieval module 216 may retrieve the transaction details 136 from the transaction database 232 and transmit them to the customer application 130.

At block 808, the customer application 130 may display the transaction details 136 to prompt the customer 112 to provide a payment request. In some embodiments, the customer application 130 may also display details on any applicable discount that is available with the transaction details 136.

At decision block 810, the customer application 130 may determine whether the customer 112 has initiated payment. In at least some embodiments, the customer 112 may initiate payment using the pay option 540 of the user interface page 530. Conversely, the customer 112 may decline the payment by selecting the cancel option. Thus, if the customer 112 initiates payment ("yes" at decision block 810), the process 800 may proceed to decision block 812.

At decision block 812, the customer application 130 may determine whether the customer elected to apply a promotional discount for one or more items in the transaction. In at least some embodiments, the customer 112 may use a prompt message 532 of the user interface page 530 to apply or decline the promotional discount. Thus, if the customer application 130 determines that the customer 112 has elected to apply the discount, the process 800 may proceed to block 814. At block 814, the customer application 130 may send a payment request 138 to the transaction service provider 102 to initiate a payment for the transaction 124 with the discount. However, if the customer application 130 determines that the customer 112 has declined to apply the discount, the process 800 may proceed to block 816. At block 816, the customer application 130 may send a payment request 138 to the transaction service provider 102 to initiate a payment for the transaction 124 without the discount. However, returning to decision block 810, if the customer 112 does not initiate payment ("no" at decision block 810), the process 800 may proceed to decision block 812. At block 818, the customer application 130 may abort the payment for the transaction 124.

Figure 9:
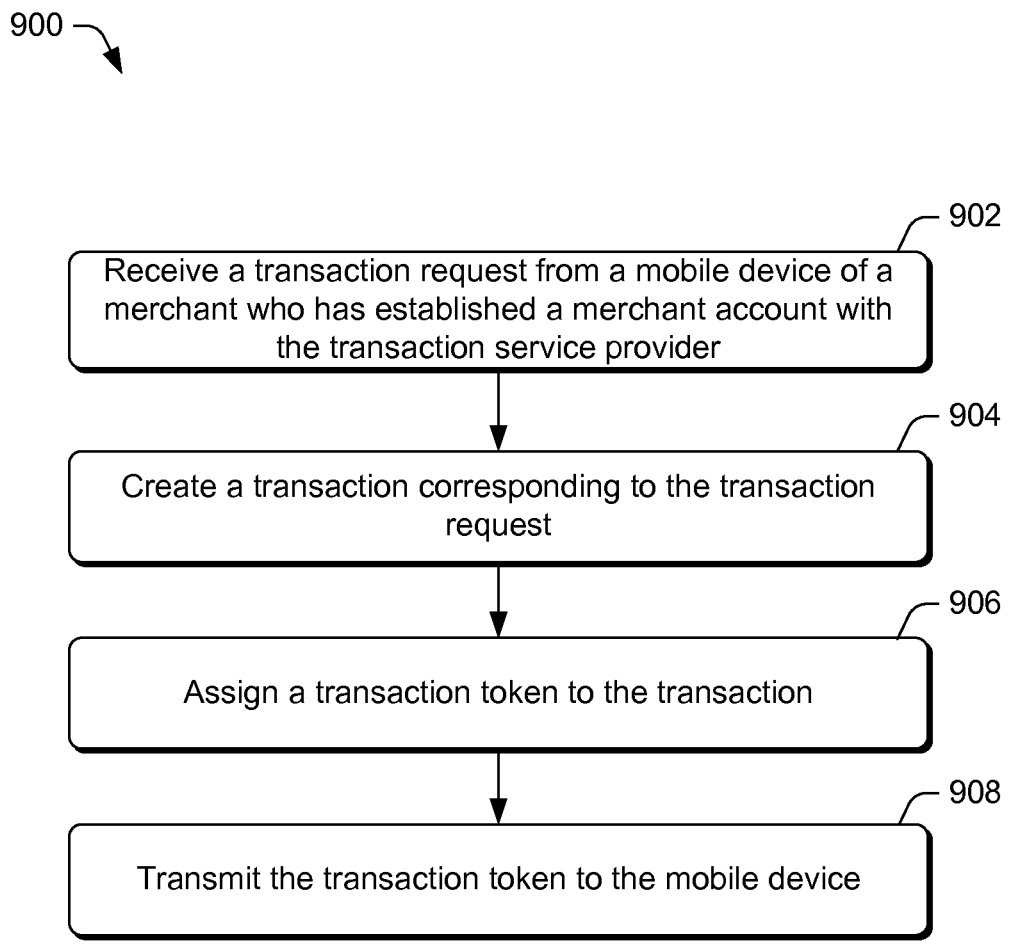
FIG. 9 is a flow diagram of an illustrative process for a transaction engine to generate a transaction token for a transaction request received from a mobile device of the merchant.

FIG. 9 is a flow diagram of an illustrative process 900 for a transaction engine to generate a transaction token for a transaction request received from a mobile device of the merchant. At block 902, the transaction management module 212 of the transaction engine 202 may receive the transaction request 122 from the mobile device 106 of the merchant 108. The transaction request 122 may include transaction details 136. The transaction details 136 may include information such as a purchase order number, a name of each item purchased, a description of each item, a cost of each item, a number of each item purchased, a purchase total, a merchant name, an identifier of a payment receivable account of the merchant 108, and/or so forth.

At block 904, the transaction management module 212 may create the transaction 124 for the transaction request 122 and then store the transaction 124 in the transaction database 232. The transaction 124 may include the transaction details 136. At block 906, the transaction management module 212 may use the transaction token module 214 to assign the transaction token 128 to the transaction 124. The transaction token 128 may be a representation (e.g., alphanumeric symbols) that uniquely represents the transaction 124.

At block 908, the transaction token module 214 may transmit the transaction token 128 to the mobile device 106. In various embodiments, the transaction token module 214 may encrypt the transaction token 128 for security purposes. The transaction may be accomplished via the network transceiver(s) 206 of the servers 104 using the network 118.

Figure 10:
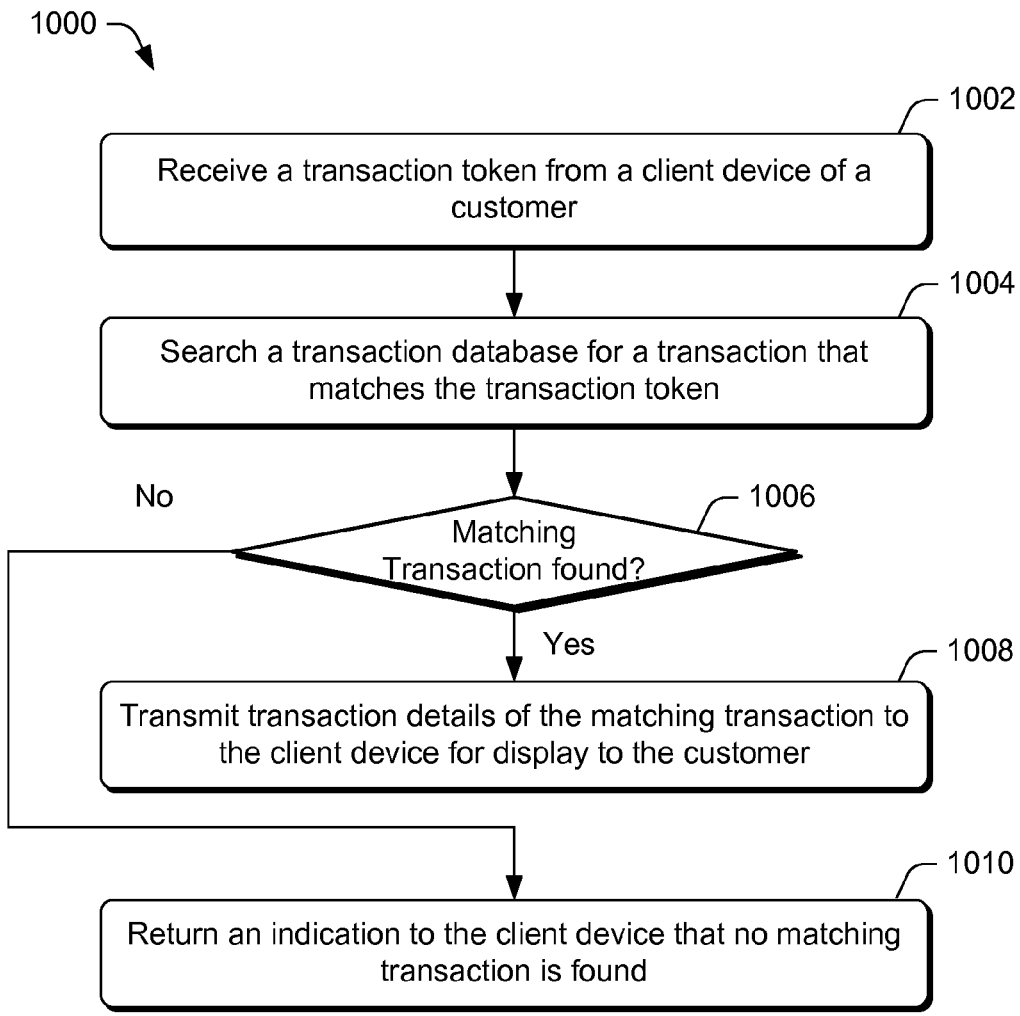
FIG. 10 is a flow diagram of an illustrative process for a transaction engine to transmit transaction details to a client device of a customer in exchange for a transaction token.

FIG. 10 is a flow diagram of an illustrative process 1000 for a transaction engine to transmit transaction details to a client device of a customer in exchange for a transaction token. At block 1002, the transaction retrieval module 216 may receive the transaction token 128 from the client device 110 of the customer 112. The transaction token 128 may be received via the network 118 by the network transceiver(s) 206 of the servers 104. In various embodiments, the transaction retrieval module 216 may receive the transaction token 128 as encrypted data, and is capable of decrypting the encrypted data to obtain the transaction token 128.

At block 1004, the transaction retrieval module 216 may search the transaction database 232 for a transaction that matches the transaction token 128. At decision block 1006, if the transaction retrieval module 216 is able to find a transaction that matches the transaction token 128 ("yes" at decision block 1006), the process 1000 may proceed to block 1008. For example, the transaction retrieval module 216 may find that that transaction 124 matches the transaction token 128.

At block 1008, the transaction retrieval module 216 may transmit the transaction details of the matching transaction (e.g., transaction details 136) to the client device 110. The transaction details 136 may be transmitted to the client device 110 via the network 118. The customer application 130 on the client device 110 may display the transaction details 136 to the customer 112.

However, if the transaction retrieval module 216 is unable to find a transaction that matches the transaction token 128 ("no" at decision block 1006), the process may proceed to block 1010. At block 1010, the transaction retrieval module 216 may return an indication to the client device 110 that no matching transaction is found via the network 118. For example, no matching transaction may be found if a matching transaction had been removed from the transaction database 232 after the expiration of a predetermined time period, or as directed by the merchant 108 using the merchant application 126. The customer application 130 on the client device 110 may display the indication to the customer 112.

Figure 11:
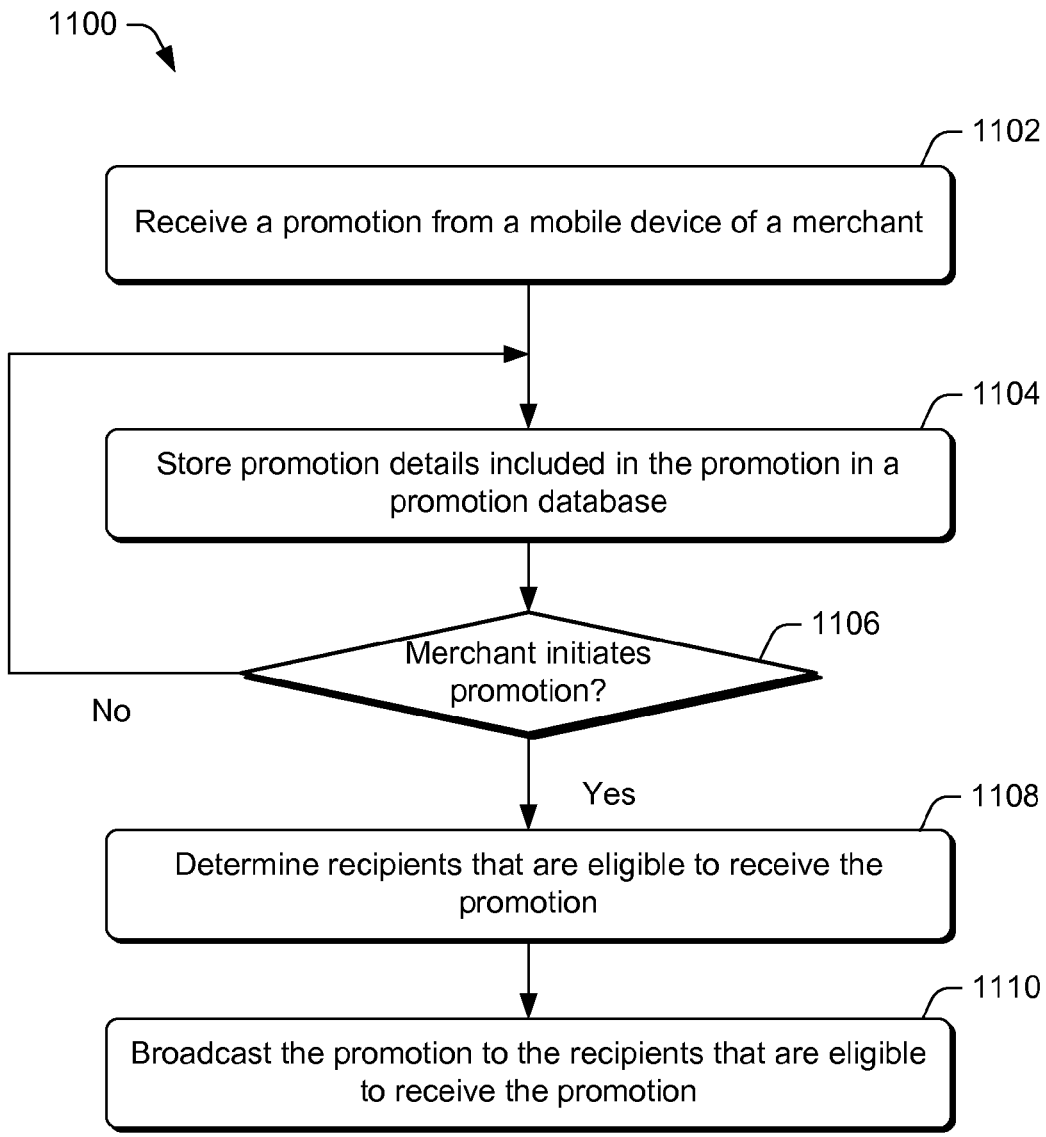
FIG. 11 is a flow diagram of an illustrative process for a transaction engine to distribute a merchant-initiated promotion to client devices of customers.

FIG. 11 is a flow diagram of an illustrative process 1100 for a transaction engine to distribute a merchant-initiated promotion to client devices of customers. At block 1102, the promotion module 220 of the transaction engine 202 may receive a promotion from a mobile device 106 of the merchant 108. The promotion may offer a discount on one or more items that may be redeemed by customers, such as the customer 112.

At block 1104, the promotion module 220 may store the promotion details of the promotion to the promotion database 234. The promotional details may include the identities of the one or more items to be discounted, an amount of the discount, descriptions of the one or more items that are discounted, the promotion start and end dates, terms of the promotion, identity of the merchant that is offering the promotion, and/or the like.

At decision block 1106, the promotion module 220 may determine whether the merchant 108 has initiated the promotion. In at least one embodiment, the merchant 108 may initiate the promotion using the initiate promotion option 440 on the user interface page 428. Thus, if the promotion module 220 determines that the merchant 108 has initiated the promotion ("yes" at decision block 1106), the process 1100 may continue to block 1108.

At block 1108, the promotion module 220 may determine one or more promotion recipients that are eligible to receive the promotion. In some embodiments, the promotion recipients may include previous customers of the merchant 108, consumers who have signed up to receive the promotion from the merchant 108, and/or a combination of these customers and consumers.

At block 1110, the promotion module 220 may broadcast the promotion to the recipients that are eligible to receive the promotion. In various embodiments, the promotion may be distributed via emails, text messages, phone calls, facsimiles, postal mails, flyers, notification packages for customer applications, and/or so forth. However, if the promotion module 220 determines that the merchant 108 has not initiated the promotion ("no" at decision block 1106), the process 1100 may loop back to block 1104.

Figure 12:
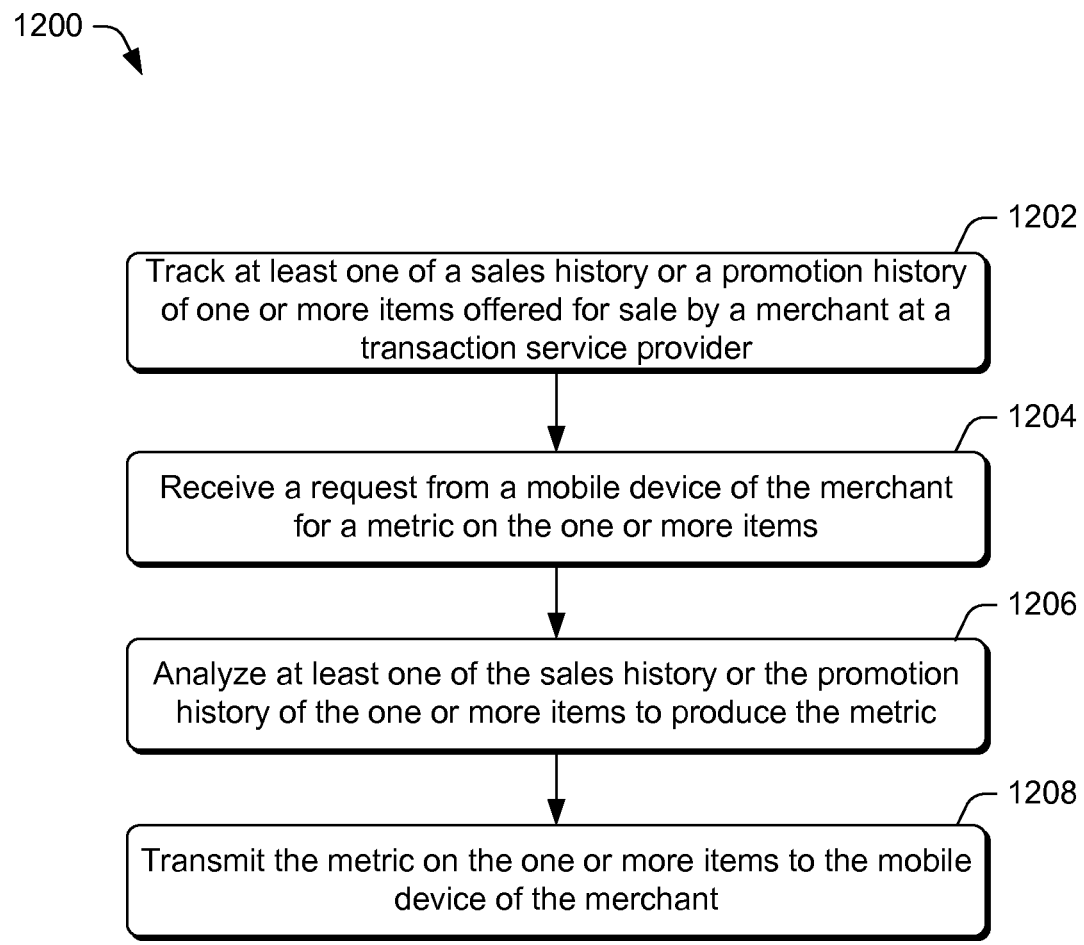
FIG. 12 is a flow diagram of an illustrative process for a transaction engine to provide metrics related to the sales and promotions of a merchant in response to a request of the merchant.

FIG. 12 is a flow diagram of an illustrative process 1200 for a transaction engine to provide metrics related to the sales and promotions of a merchant in response to a request of the merchant. At block 1202, the metrics module 222 of the transaction engine 202 may track at least one of a sales history or a promotion history of one or more items offered for sale by the merchant 108. The transaction engine 202 may be implemented by the servers 104 of the transaction service provider 102. The sales history may include details on previous sales of the one or more items, and the promotion history may include details on previous promotions for the one or more items.

At block 1204, the metrics module 222 may receive a request from the mobile device 106 of the merchant 108 for a metric on the one or more items. In various embodiments, the metric may pertain to the sales of the one or more items or pertain to a specific promotion of the one or more items. For example, the metrics may include a promotion redemption rate or a promotion conversion rate for a promotion.

At block 1206, the metrics module 222 may analyze one or more applicable histories on the one or more items to produce the metric. For example, the metric may be produced for various time periods or include one or more comparisons of data. At block 1208, the metrics module 222 may transmit the metric on the one or more items to the merchant application 126 on the mobile device 106. The merchant application 126 may then display the metric to the merchant 108.

Figure 13:
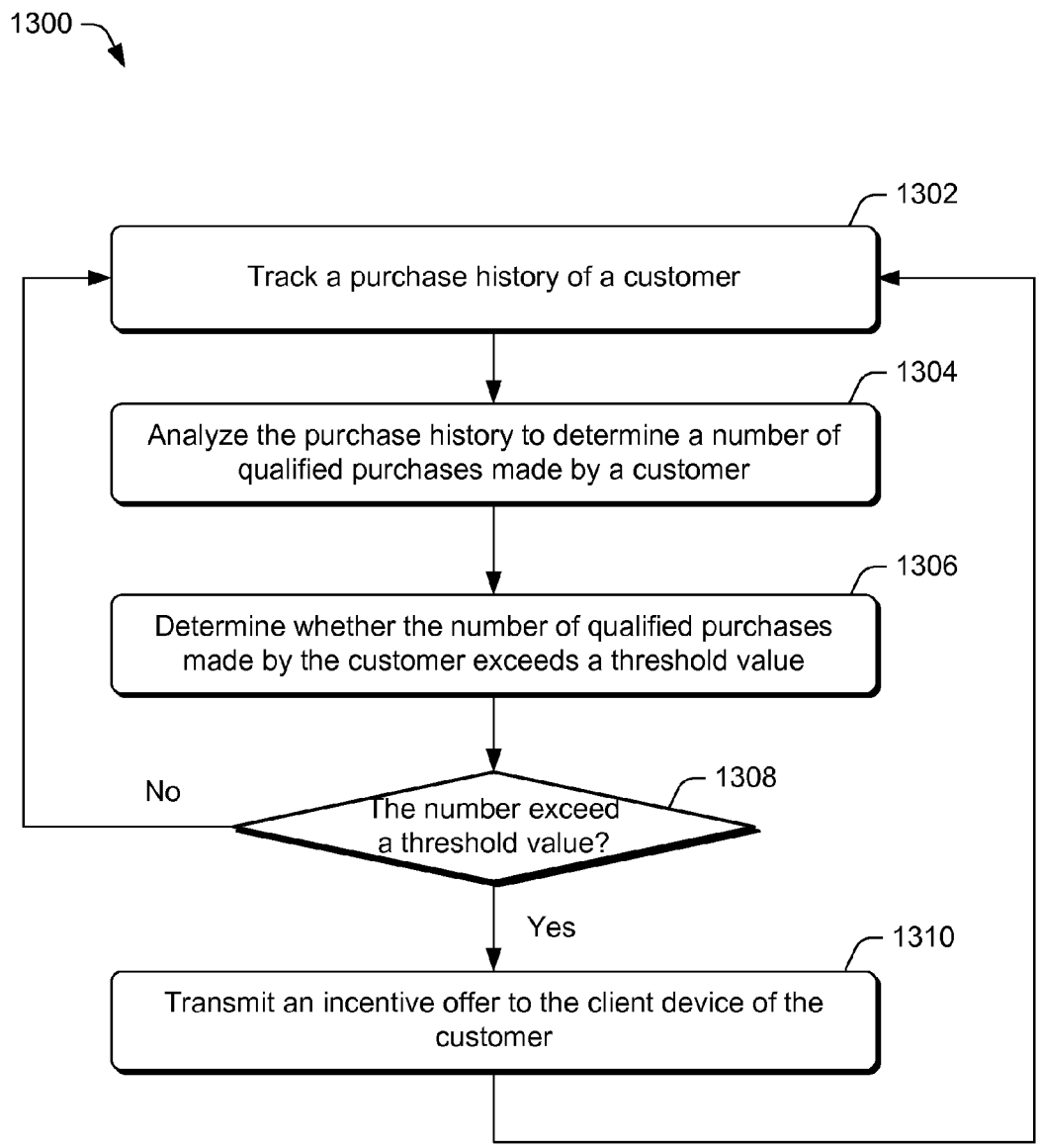
FIG. 13 is a flow diagram of an illustrative process for a transaction engine to distribute an incentive offer to a client device of a customer based on the number of purchases made by a customer.

FIG. 13 is a flow diagram of an illustrative process 1300 for a transaction engine to distribute an incentive offer to a client device of a customer based on the number of purchases made by a customer. At block 1302, the promotion module 220 of the transaction engine 202 may track a purchase history of the customer 112 with the merchant 108. The transaction engine 202 may be implemented by the servers 104 of the transaction service provider 102.

At block 1304, the promotion module 220 may analyze the purchase history to determine a number of qualified purchases made by the customer 112. In various embodiments, a qualified purchase may be the purchase of a specific item, a specific group of items, a certain category of items, or a purchase that meets a certain threshold purchase value.

At block 1306, the promotion module 220 may determine whether the number of qualified purchase made by the customer exceeds a threshold value. Thus, at decision block 1308, if the promotion module 220 determines that the number exceeds a threshold value ("yes" at decision block 1308), the process 1300 may proceed to block 1310.

At block 1310, the promotion module 220 may transmit an incentive offer to the client device 110 of the customer 112. The incentive offer may be authorized by the merchant 108. The incentive offer may include a discount on the purchase of an item, a coupon redeemable for a free item, a cash rebate, and/or so forth. The incentive offer may be presented to the customer 112 by the customer application 130 on the client device 110.

However, returning to decision block 1308, if the promotion module 220 determines that the number does not exceed a threshold value ("no" at decision block 1308), the process 1300 may loop back to block 1302 so that the promotion module 220 may continue to track the purchase history of the customer 112.

In summary, the use of a suitable mobile device with a merchant application may enable the merchant to turn the mobile device into a point-of-sale terminal that has the ability to process electronic transactions. Since the cost of a mobile device often is only a fraction of the cost of a point-sale-terminal (e.g., an electronic cash register with an attached credit card terminal), the mobile device running a merchant application may be an affordable alternative for small merchants or startup businesses who are otherwise unable to invest in conventional point-of-sale terminals.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. One or more computer readable media storing computer-executable instructions that, when executed, cause one or more processors to perform acts comprising:
   receiving at one or more computing devices a transaction request from a mobile device of a merchant via a network, the transaction request including transaction details for a purchase requested by a customer based at least on a direct communication between the customer and the merchant at a physical location associated with the merchant;
   storing the transaction details included in the transaction request into a transaction database of the one or more computing devices as a transaction;
   assigning a transaction token that uniquely identifies the transaction details at the one or more computing devices;
   transmitting the transaction token from the one or more computing devices to the mobile device of the merchant via the network;
   receiving the transaction token that identifies the transaction from a client device of the customer at the one or more computing devices after the transaction token is transmitted from the mobile device of the merchant to the client device of the customer through a short range communication directly between the mobile device of the merchant and the client device of the customer that is independent of the network, the short range communication executed within a distance from the physical location associated with the merchant, the short range communication initiated by merchant interaction with a user interface element presented via the mobile device of the merchant;
   determining whether the received transaction token matches with the transaction details stored in the transaction database of the one or more computing devices; and
   providing the transaction details of the transaction from the transaction database to the client device for display to the customer in response to determining that the transaction token matches the transaction details.

2. The one or more computer readable media of claim 1, further comprising:
   receiving a payment request from the client device of the customer to pay for the transaction;
   sending the payment request to a payment service provider on behalf of the customer, the customer having a financial account established with the payment service provider; and
   transmitting a payment confirmation to the mobile device of the merchant after receiving an approval of payment to an account of the merchant from the payment service provider.

3. A computer implemented method, comprising:
   receiving a transaction request from a mobile device of a merchant at a transaction server via a network, the transaction request including transaction details for a purchase requested by a customer based at least on a direct in-person communication between the customer and the merchant;
   transmitting a transaction token that identifies a transaction from the transaction server to the mobile device of the merchant via the network, the transaction including the transaction details from the transaction request;
   receiving the transaction token that identifies the transaction from a client device of the customer at the transaction server after the transaction token is transmitted from the mobile device of the merchant to the client device of the customer through a short range communication directly between the mobile device of the merchant and the client device of the customer that is independent of the network, the short range communication initiated by merchant interaction with a user interface element presented via the mobile device of the merchant; and
   providing the transaction details of the transaction that matches the transaction token to the client device for display to the customer.

4. The computer implemented method of claim 3, further comprising:
   receiving a payment request from the client device of the customer to pay for the transaction;
   transferring the payment request to a payment service provider on behalf of the customer, the customer having a financial account established with the payment service provider; and
   transmitting a payment confirmation to the mobile device of the merchant after the payment service provider sends a payment from the financial account into an account of the merchant.

5. The computer implemented method of claim 4, wherein the receiving the payment request includes receiving the payment request following an authentication of the customer as authorized to access a corresponding customer account, and wherein the transferring the payment request includes selecting the payment service provider to receive the payment request based on information in the corresponding customer account.

6. The computer implemented method of claim 4, wherein the receiving the payment request includes receiving the payment request to pay a discounted amount, and wherein the transmitting the payment confirmation includes transmitting the payment confirmation to show the discounted amount is paid in the payment.

7. The computer implemented method of claim 3, further comprising:
   receiving a location of the merchant from the mobile device of the merchant; and
   forwarding the location of the merchant to the client device for display to the customer.

8. The computer implemented method of claim 7, further comprising initiating a promotion as requested by the merchant that offers a discount on one or more items, and wherein forwarding the location includes forwarding the location of the merchant to the client device as a part of the promotion.

9. The computer implemented method of claim 3, further comprising:
   receiving a promotion that offers a discount on one or more items from the mobile device of the merchant;
   receiving a promotion initiation request from the mobile device of the merchant; and
   distributing the promotion to one or more promotion recipients that include at least one of a previous customer of the merchant or a consumer that subscribes to promotions from the merchant in response to the promotion initiation request.

10. The computer implemented method of claim 9, further comprising:
    tracking at least one of a sales history or a promotion history on the one or more items;
    receiving a request from the mobile device of the merchant for a metric evaluating an effectiveness of a promotion for the one or more items;
    analyzing the at least one of the sales history or the promotion history on the one or more items to produce the metric; and
    transmitting the metric on the one or more items to the mobile device of the merchant.

11. The computer implemented method of claim 3, further comprising:
    tracking a purchase history of the customer as the customer purchases items from the merchant; and
    transmitting an incentive offer to the customer in response to determining that the purchase history indicates that a number of qualified purchases by the customer exceeds a threshold value.

12. The computer implemented method of claim 3, wherein the transmitting the transaction token includes transmitting an encrypted transaction token, and wherein the receiving the transaction token includes receiving an encrypted transaction token.

13. The computer implemented method of claim 3, wherein the short range communication further includes an acoustic-based communication, a light-based communication, an image-based communication, or a radio signal-based communication.

14. The computer implemented method of claim 3, wherein the short range communication includes transmitting the transaction token as sound from a speaker of the mobile device to a microphone of the client device.

15. One or more computer readable media storing computer-executable instructions that, when executed, cause one or more processors to perform acts comprising:
    at a mobile device of a merchant, creating a transaction request that includes transaction details for an item to be purchased by a customer based at least on a purchase request communicated directly from the customer to the merchant, the purchase request executed within a distance of a physical location associated with the merchant;
    sending the transaction request from the mobile device of the merchant to a server via a network;
    receiving a transaction token from the server at the mobile device of the merchant via the network, wherein the transaction token uniquely identifies a transaction stored on the server that includes the transaction details;
    transmitting the transaction token from the mobile device of the merchant to a client device of a customer using a short range communication directly between the mobile device of the merchant and the client device of the customer that is independent of the network, wherein the transaction token enables the client device to retrieve the transaction details and initiate a payment request for the transaction, the short range communication initiated by merchant interaction with a user interface element presented via the mobile device of the merchant;
    receiving a payment confirmation from the server in response to determining the payment request results in a payment service provider making or approving a payment for the transaction on behalf of the customer; and
    receiving an indication that the transaction is unpaid in response to determining the payment request is denied by the payment service provider.

16. The one or more computer readable media of claim 15, wherein the transmitting includes transmitting the transaction token to the client device through an acoustic-based communication, a light-based communication, an image-based communication, or a radio signal-based communication.

17. The one or more computer readable media of claim 16, wherein the transmitting through the acoustic-based communication includes sending the transaction token as sound from a speaker of the mobile device to a microphone of the client device.

18. The one or more computer readable media of claim 15, further comprising receiving a metric from the server that pertains to a promotion that offers a discount on one or more items in response to sending a metric request to the server.

19. The one or more computer readable media of claim 15, further comprising:
    sending a promotion for storage in the server, the promotion offering a discount on one or more items; and
    transmitting a promotion initiation request that commands the server to distribute the promotion to one or more promotion recipients.

20. The one or more computer readable media of claim 15, further comprising receiving an inventory status of an item from the server in response to sending an inventory status request to the server.

21. A system, comprising:
    one or more processors; and
    one or more memories storing computer-executable instructions that are executable by the one or more processors to perform operations comprising:
      receiving a transaction request for a purchase from a mobile device of a merchant via a network, and stores transaction details included in the transaction request into a transaction database as a transaction, the transaction details based at least on a direct in-person communication between a client device associated with a customer and the merchant;

creating a transaction token identifying the transaction, and transmits the transaction token to the mobile device of the merchant via the network; and receiving the transaction token that identifies the transaction from the client device of the customer after the transaction token is transmitted from the mobile device of the merchant to the client device through a short range communication directly between the mobile device of the merchant and the client device of the customer that is independent of the network, and provides transaction details of the transaction that matches the transaction token to the client device for display to the customer, the short range communication initiated by merchant interaction with a user interface element presented via the mobile device of the merchant.

22. The system of claim 21, wherein the operations further comprise:

receiving a payment request from the client device of the customer to pay for the transaction;

sending the payment request to a payment service provider on behalf of the customer, the customer having a financial account established with the payment service provider; and transmitting a payment confirmation to the mobile device of the merchant following the payment service provider sending a payment or an approval of the payment from the financial account to the merchant.

23. The system of claim 21, wherein the operations further comprise:

receiving a promotion that offers a discount on one or more items from the mobile device of the merchant; and distributing the promotion to one or more promotion recipients that include at least one of a previous customer of the merchant or a consumer that subscribes to promotions from the merchant.

24. The system of claim 21, wherein the operations further comprise sending an inventory status of an item to the mobile device in response to receiving an inventory status request for the item.

25. The system of claim 21, wherein the operations further comprise:

tracking at least one of a sales history or a promotion history on one or more items offered for sale by the merchant;

receiving a request from the mobile device of the merchant for a metric on the one or more items;

analyzing the at least one of the sales history or the promotion history on the one or more items to produce the metric; and transmitting the metric on the one or more items to the mobile device of the merchant.

\* \* \* \* \*